(12) United States Patent
Heim et al.

(10) Patent No.: US 11,363,223 B2
(45) Date of Patent: Jun. 14, 2022

(54) PIXEL CIRCUIT FOR AN ULTRA-LOW POWER IMAGE SENSOR

(71) Applicant: CSEM Centre Suisse d'Electronique et de Microtechnique SA—Recherche et Développement, Neuchâtel (CH)

(72) Inventors: Pascal Heim, St. Aubin (CH);
Pierre-François Rüedi, Marin (CH);
Riccardo Quaglia, Neuchâtel (CH);
Engin Türetken, Ecublens (CH);
Pascal Nussbaum, Fontainemelon (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 0 days.

(21) Appl. No.: 17/258,938

(22) PCT Filed: Jul. 9, 2019

(86) PCT No.: PCT/IB2019/055834
§ 371 (c)(1),
(2) Date: Jan. 8, 2021

(87) PCT Pub. No.: WO2020/012353
PCT Pub. Date: Jan. 16, 2020

(65) Prior Publication Data
US 2021/0344858 A1    Nov. 4, 2021

(30) Foreign Application Priority Data

Jul. 10, 2018 (EP) ...................................... 8182685

(51) Int. Cl.
*H04N 5/369* (2011.01)
*H04N 5/355* (2011.01)
(Continued)

(52) U.S. Cl.
CPC ........... *H04N 5/3698* (2013.01); *H04N 5/355* (2013.01); *H04N 5/378* (2013.01); *H04N 5/37452* (2013.01)

(58) Field of Classification Search
CPC .. H04N 5/3698; H04N 5/355; H04N 5/37452; H04N 5/378
See application file for complete search history.

(56) References Cited

U.S. PATENT DOCUMENTS

| 2009/0231479 | A1* | 9/2009 | Zarnowski | ............. | H04N 5/378 348/302 |
| 2010/0019127 | A1* | 1/2010 | Kagawa | ............. | H04N 5/37455 250/208.1 |
| 2011/0007199 | A1 | 1/2011 | Heim et al. | | |

FOREIGN PATENT DOCUMENTS

| EP | 2093996 A1 | 8/2009 |
| EP | 2243287 B1 | 12/2011 |

OTHER PUBLICATIONS

International Search Report for PCT/IB2019/055834 dated Dec. 5, 2019.

(Continued)

*Primary Examiner* — Nicholas G Giles
(74) *Attorney, Agent, or Firm* — Pearne & Gordon LLP

(57) ABSTRACT

A pixel circuit for a ultra-low power image sensor, including: an integration node, on which a photodiode current is integrated, a comparator arranged to compare a voltage at the integration node with a reference voltage, a n+1 bits digital memory, a writing pulse signal generator arranged to generate a writing pulse signal, on the basis of the comparator output voltage and on the voltage at a memory node, the start of the pulse triggering the writing of the digital word in the n-bits digital memory part. The comparator includes a switch in series with a current source and arranged to be commanded by the voltage at the memory node so that the (Continued)

switch is open at the end of the pulse, so as to drastically limit the consumption of static power of the pixel circuit during the integration phase.

24 Claims, 15 Drawing Sheets

(51) Int. Cl.
*H04N 5/3745* (2011.01)
*H04N 5/378* (2011.01)

(56) References Cited

OTHER PUBLICATIONS

Written Opinion for PCT/IB2019/055834 dated Dec. 5, 2019.
Chung, Meng-Ting, et al., "A 0.5 V PWM CMOS Imager With 82 dB Dynamic Range and 0.055% Fixed-Pattern-Noise", IEEE Journal of Solid-State Circuits, Oct. 2013, pp. 2522-2530, vol. 48, No. 10.

* cited by examiner

PIXEL CIRCUIT FOR AN ULTRA-LOW POWER IMAGE SENSOR

FIELD OF THE INVENTION

The present invention concerns a pixel circuit for an ultra-low power image sensor. The present invention concerns also this ultra-low power image sensor and a camera device comprising this ultra-low power image sensor.

DESCRIPTION OF RELATED ART

Nowadays, the demand for low power digital image sensors operating at low voltage is increasing.

In the present context, the expression "low voltage" indicates a voltage less than 2 V, e.g. 1.8 V or less.

In the present context, the expression "low power" indicates a power less than 1 mW, e.g. some tenths of mW.

In the present context, the expression "ultra-low power" indicates a power well lower than 1 mW, e.g. some hundredth of mW or less.

This low or ultra-low power digital image sensor can be used in different applications, including but not limited to mobile imaging, biomechanical domain (e.g. implantable and/or disposable devices), wireless sensor network, IoT (Internet of Things), wearables, remote sensing, etc.

The document EP2243287 filed by the applicant, the content of which is herein integrated by reference, describes a pixel circuit for an image sensor.

This pixel circuit uses a concept called "Time-to-Vref" which consists of measuring the time which the voltage resulting from the integration of a photo-current on a capacitance takes for reaching a threshold set a priori and called Vref. This allows operation over a very large dynamic range of light illumination.

As illustrated in FIG. 1, the described pixel circuit 10 comprises an analog front-end A and a digital part D. The analog front-end A comprises:
a photodiode 1 for receiving a light beam L representing a visual scene and for generating a photodiode current Iphd,
an integrator 3, comprising an amplifier OA, e.g. a high gain amplifier, a capacitor Cp, the voltage at the output of the integrator 3 Vint being representative of the photodiode current Iphd, integrated by the amplifier OA during an integration phase,
a comparator 2 arranged to compare the voltage Vint at the integration node with the reference voltage Vref, and to generate a comparator output voltage Vcmp.

In the illustrated example, the digital part D comprises:
a writing pulse signal generator 4 arranged to generate a writing pulse signal WR, and
a n+1 bits digital memory 56, which is preferably a static memory as a RAM memory. The digital memory 56 can be in alternative a dynamic memory.

It must be understood that in alternative the memory 56 can be an analog memory.

As illustrated in FIG. 2, the memory, in this case a n+1 bits digital memory (in particular a 10+1 bits digital memory) comprises:
a n-bits (10 bits) memory element, comprising n cells $6_1, 6_2, \ldots, 6_n$, for storing a digital word bn ... b1, representative of the time elapsed since the beginning of the integration phase, and
a 1-bit digital memory element, comprising in this case one cell 5.

This memory is arranged to store in each of the n+1 cells a bit. Among those bits, n bits represent the above-mentioned digital word. The remaining bit allows to terminate the writing pulse signal WR.

We are referring now to the cell $6_1$. However, same considerations apply to the other n cells of the n-bits memory element. The cell $6_1$ comprises two CMOS inverters 61 and 62, mounted head to foot and intended to be used as a latch. The transistor 63 is the transistor for accessing the cell both when reading and writing. Writing only allows placement of a zero on the node m0.

For this, the bit line $b_1$ is maintained to zero while a write pulse in the high state is applied on the control line WL. The node m0 is then pulled to the low voltage imposed on the bit line by the transistor 63. Reading of the node m0 after acquiring the image is also performed by means of a pulse in the high state on the control line WL after having pre-charged the bit line to the positive supply voltage.

If m0 is low, the bit line is then discharged through the transistor 63. If m0 is high, the bit line stay at its pre-charged level. The transistor 64 is the transistor for writing into the cell memory $6_1$ from the inside of the pixel. After resetting to zero the memories, all the nodes m1 are in the high state and all the nodes m0 are in the low state. The cells $6_1, 6_2, \ldots, 6_n$ therefore contain zeroes.

When the pixel produces a write pulse WR, making the transistor 64 conducting will conditionally pull the m1 node to the low state depending on the state present on the bit line of the memory. If this bit line is in the low state, the transistor 65, which is the transistor for writing into the memory 60, controlled by the datum present on the bit line bi, is blocked (i.e. non-conducting) and the m1 node remains in the high state (the memory retains its zero state).

On the other hand, if the bit line is in the high state, simultaneous conduction of transistors 64 and 65 during the pulse WR will pull the m1 node to the low state, which corresponds to writing a "1" into the memory. The transistor 65 for writing into the memory 60 is actually controlled by the datum present on the bit line b1.

The memory cell 5 is set to zero before sensing an image, generally at the same time as the memory word. From the beginning and during the whole sensing of the image, the bit line $b_{n+1}$ of the memory cell 5 is maintained in the high state, so as to make transistor 55 conducting.

When the output Vcmp of the comparator 2 switches to the high state, i.e. when Vint reaches Vref, the signal WR switches to the high state which makes transistor 54 conducting, and then causes the signal m1 to switch to the low state in order to finally terminate the pulse WR by blocking the AND gate 42'.

By resuming, the writing pulse signal generator 4 comprises a digital port (an AND port 42' in the illustrated case) arranged to generate a writing pulse signal WR on the basis of the comparator output voltage Vcmp and of a voltage at a memory node (m1 in the example), in particular a voltage of the 1-bit element of the digital memory, this writing pulse signal comprising a pulse having a start S and an end E.

As described, the start S of the pulse triggers the writing of the digital word in the n-bits digital memory element 6.

The previous description is one possibility to generate the write pulse, however other implementations are possible, for example and in a non-limiting way the write pulse can be generated by combining the comparator output Vcmp with a delayed version of itself.

The integration phase is in general preceded by a reset phase in which the switch SWrst is commanded by a reset signal RST so as to put the voltage at the integration node Vint at a known value, which in one preferred embodiment defines the black level of the pixel. The duration of the reset phase can be set by the user. Preferably, the voltage applied on the reset signal is adapted to enable enough conduction of the switch SWrst in the on state, while minimizing charge injection when the switch SWrst opens (goes in the off state).

The integration phase is followed by a readout phase during which the digital words are read by an image readout module and for example stored in an external memory.

Although the described pixel circuit has some advantages, as it is robust, compact and efficient, its static power consumption prevents to use it in low power and in particular in ultra-low power image sensors.

In this context, the static power consumption is the power consumed in the pixel circuit by a non-null DC current, i.e. by a current whose value does not vary over time. In other words, transient currents do not generate static power consumption. For example, power in the digital part D is consumed only during transients. Therefore, the digital part D does not consume static power.

The document "A 0.5 V PWM CMOS Imager With 82 dB Dynamic Range and 0.055% Fixed-Pattern-Noise", M.-T. Chung et al, published in the IEEE Journal of Solid-State Circuits, Vol. 48, No 10, October 2013 describes a low power CMOS imager, comprising a threshold-variation-cancelling (TVC) scheme to eliminate the fixed pattern noise in the CMOS image sensor (CIS) and a programmable current-controlled threshold (PCCT) scheme to achieve a high dynamic range.

In this document, the comparator is biased with two different currents, one used during the reset phase (IRST) and the other used during the integration phase (IINT). In particular, the current of the reset phase is smaller than the current of the integration phase. The threshold of the comparator is determined by this current ratio. In the described comparator, there is a flow of a DC current during both the reset and integration phases.

A known 3-T pixel of an image sensor consumes a static current only when the voltage of the pixel is read out of the pixel array before being digitized by an ADC, usually one ADC per column of the pixel array. However, the global power consumption to digitize the pixel voltage (comprising the DC current during the read out of the voltage and the current consumption of the ADC) is still too high to use it in low-power or ultra-low power applications.

There is therefore a need for a pixel circuit adapted for a low or ultra-low power image sensor In other words, there is a need for a pixel circuit wherein the consumption of the static current of the analog front end is as limited (or reduced) as possible.

BRIEF SUMMARY OF THE INVENTION

According to the invention, these aims are achieved by means of the pixel circuit according to claim 1, by means of the ultra-low power image sensor according to claim 21 and by means of the camera device according to claim 23.

The pixel circuit for a ultra-low power image sensor according to the invention comprises:

a photodiode for receiving a light beam representing a visual scene and for generating a photodiode current, an integration node, on which the photodiode current is integrated during an integration phase, a comparator arranged to compare a voltage at the integration node with a reference voltage, and to generate a comparator output voltage, the comparator comprising a current source arranged for generating a current, a memory element comprising a memory node, a writing pulse signal generator arranged to generate a writing pulse signal, on the basis of the comparator output voltage and on the voltage at the memory node, the writing pulse signal comprising a pulse having a start and an end.

Advantageously the comparator further comprises a switch in series with the current source, the switch being arranged to be commanded by the voltage at the memory node so that the switch is open at the end of the pulse, so as to limit, in particular drastically limit, the consumption of static power of the pixel circuit during the integration phase.

In one embodiment the pixel circuit according to the invention comprises:

a photodiode for receiving a light beam representing a visual scene and for generating a photodiode current, an integration node, on which said photodiode current is integrated during an integration phase, a comparator made of a first transistor MN3 acting as a current source, a second transistor MP1 of opposite type with its drain connected to the drain of the first transistor and its gate connected to the integration node, and a third transistor MP2 enabling to short circuit the drain and gate of MP1, where in a first phase a first reference voltage is applied on the source of MP1 while MP2 is closed and in a second phase, a second reference voltage is applied on the source of MP1, while MP2 is open.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

The different embodiments of the pixel circuit here described are specifically adapted for an ultra-low power image sensor. However, they could be used also for other kinds of image sensors, for example for image sensor with a power equal or higher than 1 mW. They could also comprise nodes at voltages higher than 1.8 V or higher than 2 V. Their supply voltage can also be higher than 1.8 V or higher than 2 V.

In the following description and figures, for the sake of simplification and comprehensiveness, it is stated that the comparator output toggles when voltage of the node int reaches Vref even though there might be an offset between these two voltages when the comparator toggles. As will become apparent with the description, in a preferred embodiment there is always an offset between Vref and the voltage of node int at the switching point of the comparator. This offset corresponds to the Vgs voltage of a diode connected transistor biased by a small current (e.g. a few nA, or 2 nA). Also during the reset phase, in a preferred embodiment there is an offset between the Vref voltage and the voltage at node int, not illustrated on the figures.

Figure 3:
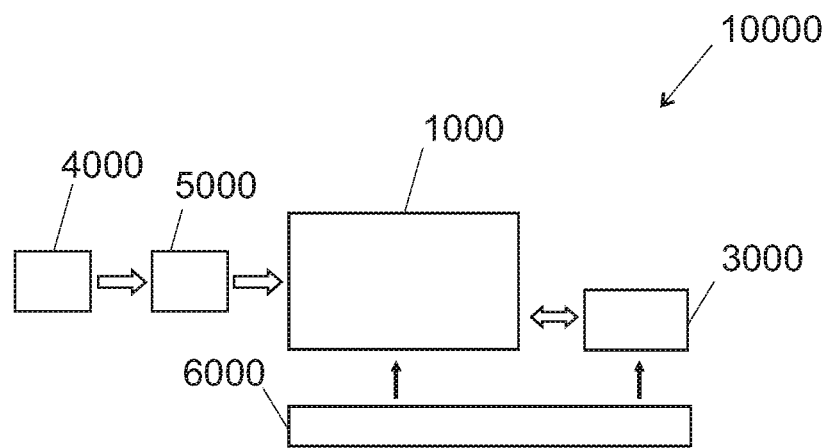
FIG. 3 shows a block diagram of a camera device comprising the image sensor according to one embodiment of the invention.

FIG. 3 shows a block diagram of a camera device 10000 comprising the image sensor 1000 according to one embodiment of the invention.

The light of a scene 4000 is focused by an optical module 5000 on the pixel array of the image sensor 1000. The optical module 5000 will be briefly discussed later.

In one embodiment, the image sensor 1000 comprises either an internal oscillator with an external quartz, or an external oscillator.

In the embodiment illustrated in FIG. 3, the image sensor 1000 has a bidirectional communication with a micro-controller 3000.

In the embodiment illustrated in FIG. 3, the image sensor 1000 and the micro-controller 3000 are both supplied by a voltage supply 6000, e.g. and in a non-limiting way a 1.8 V voltage supply belonging to the camera device. In one preferred embodiment, the voltage supply 6000 comprises a PV cell. In one preferred embodiment, the device 10000 is therefore autonomous.

Figure 4:
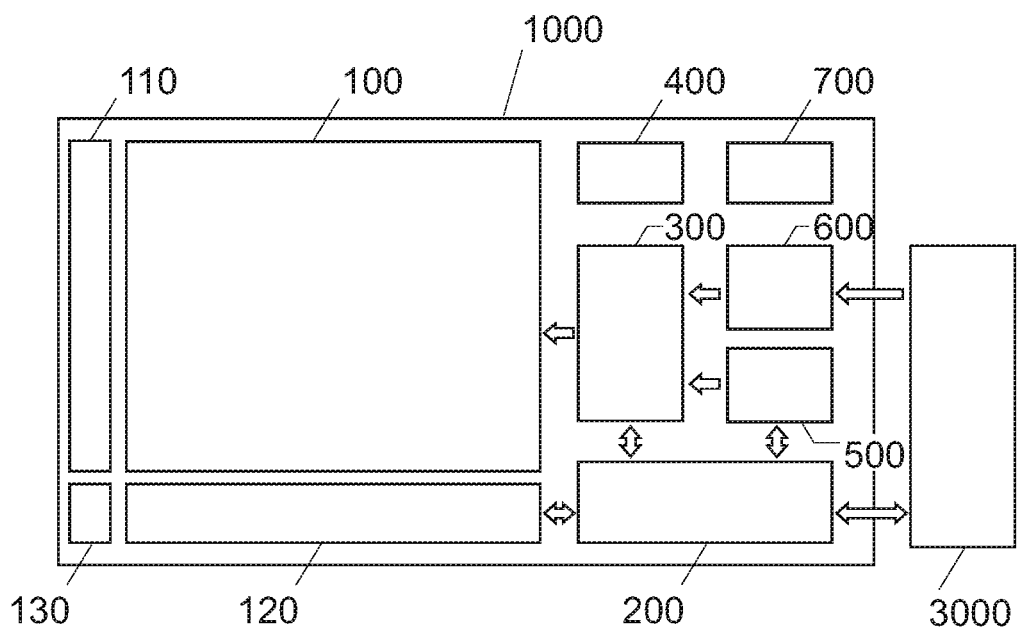
FIG. 4 shows a block diagram of the image sensor according to one embodiment of the invention, cooperating with a microcontroller.

FIG. 4 shows a block diagram of the image sensor 1000 according to one embodiment of the invention, cooperating with a microcontroller 3000.

In the embodiment of FIG. 4, the image sensor 1000 comprises a pixel array 100. In a preferred embodiment, the pixel array comprises 320×320 pixel circuits according to the invention. In one preferred embodiment, the pixel circuits of this array have a low fill factor, i.e. the ratio between active photodiode area and pixel area is far below 70%, e.g. less than 50%.

In one preferred embodiment, this low fill factor is almost totally compensated by the use of specific lenses in the optical module 5000. In another embodiment, taking advantage of 3D stacking processes, the digital part and memory are stacked over or below the photodiode and/or the analog front-end, for example by hybrid wafer bonding, thus increasing the fill factor and decreasing the pixel size. In a further embodiment, backside illumination is used to reach a fill factor close to 100%.

In one preferred embodiment, the pixel circuit is large, i.e. its size (i.e. its pitch, which is a length) is equal or larger than 3 µm, e.g. 5 µm or more, e.g. 14 µm.

A row of the pixel array can be selected via the row addressing module 110. Pixels of a selected row output the content of their internal n-bit digital memory element on a bit line of a data bus of the corresponding column via the column readout module 120. A biases module 130 supplies the analog part of the pixel circuits of the pixel array.

An internal oscillator 700 provides a clock to the image sensor 1000. The microcontroller 3000 communicates with a control module 600 of the image sensor, allowing to set parameters via a module 300 comprising a DAC, as for example the value of the reference voltage Vref. The image sensor further comprises a counter 500, for example, a logarithmic counter as it will be described. This counter 500 communicates in FIG. 4 with the module 300 (or in alternative with another module not illustrated) in order to set some parameters of the counter as well.

To help integration in battery powered systems, in one preferred embodiment the image sensor 1000 according to the invention is entirely driven through a single SPI interface 200, including an image read-out module (not illustrated). The SPI is an interface used in many ultra-low power micro-controllers and provides a good throughput.

Depending on the application requirements about the frame-rate, the image sensor 1000 can be alternately connected to a SD-Card interface (not illustrated) of a more power-full controller. The SD-Card interface is a four lanes SPI interface and can hence provide increased pixel transfer throughput. For even higher data throughput, a parallel data bus of 10 bits could be used.

Figure 5:
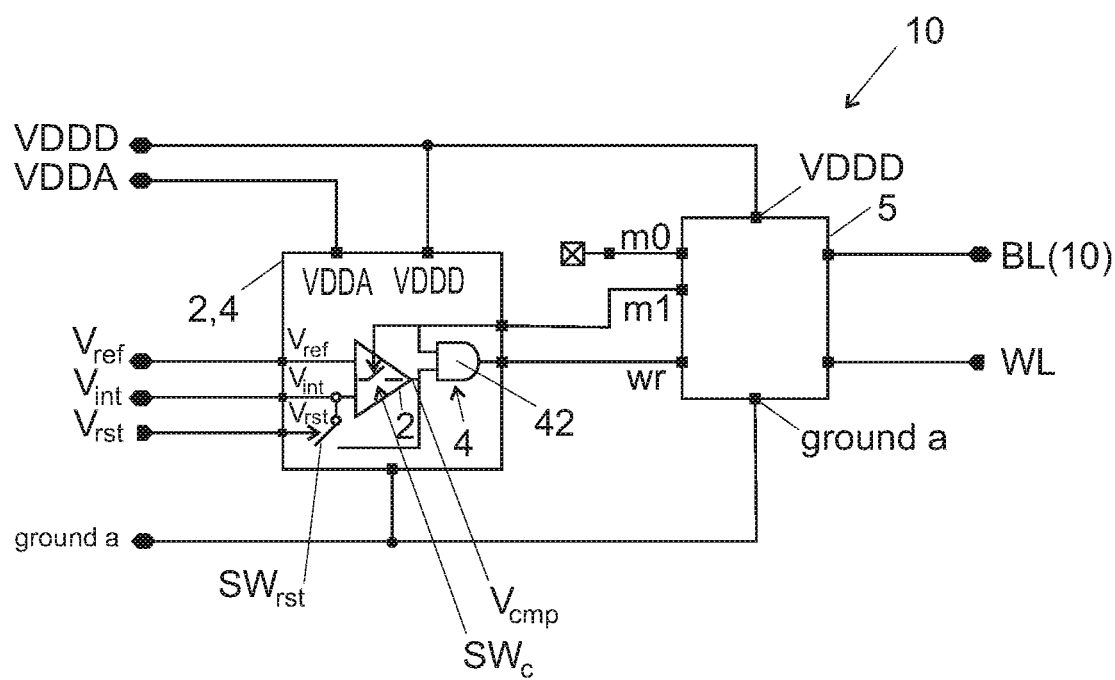
FIG. 5 shows a block diagram of a part of the pixel circuit according to one embodiment of the invention.

FIG. 5 shows a block diagram of the pixel circuit 10 according to one embodiment of the invention. In this case, the photodiode is not illustrated. The illustrated pixel circuit 10 comprises the integration node, on which the photodiode current of the photodiode is integrated, thereby generating the voltage Vint, representative of the photodiode current.

The comparator 2 is arranged to compare the voltage Vint with a reference voltage Vref, whose value is set by the module 300. In most of the cases, the reference voltage Vref is the same for all the pixels of the image sensor 1000. However, it is possible to imagine that in other embodiments, it can vary from a region of the image sensor to another.

The comparator 2 generates then a comparator output voltage Vcmp. In one preferred embodiment, Vcmp is at a low value and passes to a high value when Vint reaches Vref. The comparator 2 comprises a current source arranged for generating a static current (not illustrated).

The pixel circuit 100 of FIG. 5 further comprises a writing pulse signal generator 4, arranged to generate a writing pulse signal WR. In the illustrated example, the writing pulse signal generator comprises a logic gate, for example and in a non-limiting way an AND logic gate, having at its inputs the comparator output voltage Vcmp and the voltage at a node m1 of the memory element 5.

As discussed, the start of the pulse triggers the writing of a digital word WR, for example in a n-bits digital memory element (not illustrated). This digital word represents the time elapsed since the beginning of the integration phase.

However, the invention is not limited to a n-bits-digital memory element but can be applied also to an analog memory element, wherein the digital word BL(9:0) is replaced by an analog voltage encoding the time elapsed since the start of the exposure phase. When the comparator output changes, the value of such a voltage at that time is stored on a capacitor. The stored voltage can then be read with for example a source follower like in a standard image sensor, and converted to a digital value by an ADC.

Although in the embodiment of FIG. 5 the one-bit memory element 5 is a static memory element, the present invention is not limited to such a memory but could be applied also to a dynamic memory element. The same applies to the n-bits digital memory element.

As discussed, the reference WL (word line) indicates the signal for reading the memory element 5. This signal is also used for resetting to zero all the n memory cells $6_1, \ldots, 6_n$ (not illustrated in FIG. 5) before any new image acquisition during the reset phase.

The pixel circuit 100 of FIG. 5 is supplied by a supply voltage for the digital part VDDD and by a supply voltage for the analog part VDDA, which in general is different from VDDD. In another embodiment, the n memory cells have a different supply voltage lower than VDDD to reduce the switching power and/or leakage current.

In one preferred embodiment, the supply voltage for the digital part VDDD is less than the supply voltage for the analog part VDDA. For example, the supply voltage for the digital part VDDD is less than 1 V, e.g. 0.7 V; the supply voltage for the analog part VDDA is less than 3.6 V, e.g. 1.8 V.

According to the invention, the comparator 2 of FIG. 5 further comprises a switch SWc, in series with the current source (not illustrated), this switch being arranged to be commanded by a voltage at the memory node m1, so that this switch SWc is open at the end of the pulse of the signal WR, so as to limit, in particular drastically limit (e.g. reduce by 95% or more), the consumption of static power of the pixel circuit 10 during the integration phase.

Although in FIG. 5 the switch SWc of the comparator is commanded by the voltage at the node m1, in another embodiment (not illustrated) it could be commanded by the voltage at the node m0, in particular followed by an inverter.

As the switch SWc opens at the end of the pulse of the signal WR, there is no static power consumption in the pixel circuit during the integration phase except for the duration of the WR pulse, which is in the order of magnitude of tens of ns.

The duration of the WR pulse depends on the switching rate of the two inverters 51 and 52 (visible in FIG. 6) and on the transmission delay of the logic gate 42 (visible in FIG. 5). In order to be sure that the duration of this pulse is sufficient for switching all the cells of the memory element 6, the length of the transistor 55 is larger than that of the transistor 65 of the cells of the memory element 6, so that the switching time of the cell 5 is longer than that of the other cells in the worst case.

Figure 6:
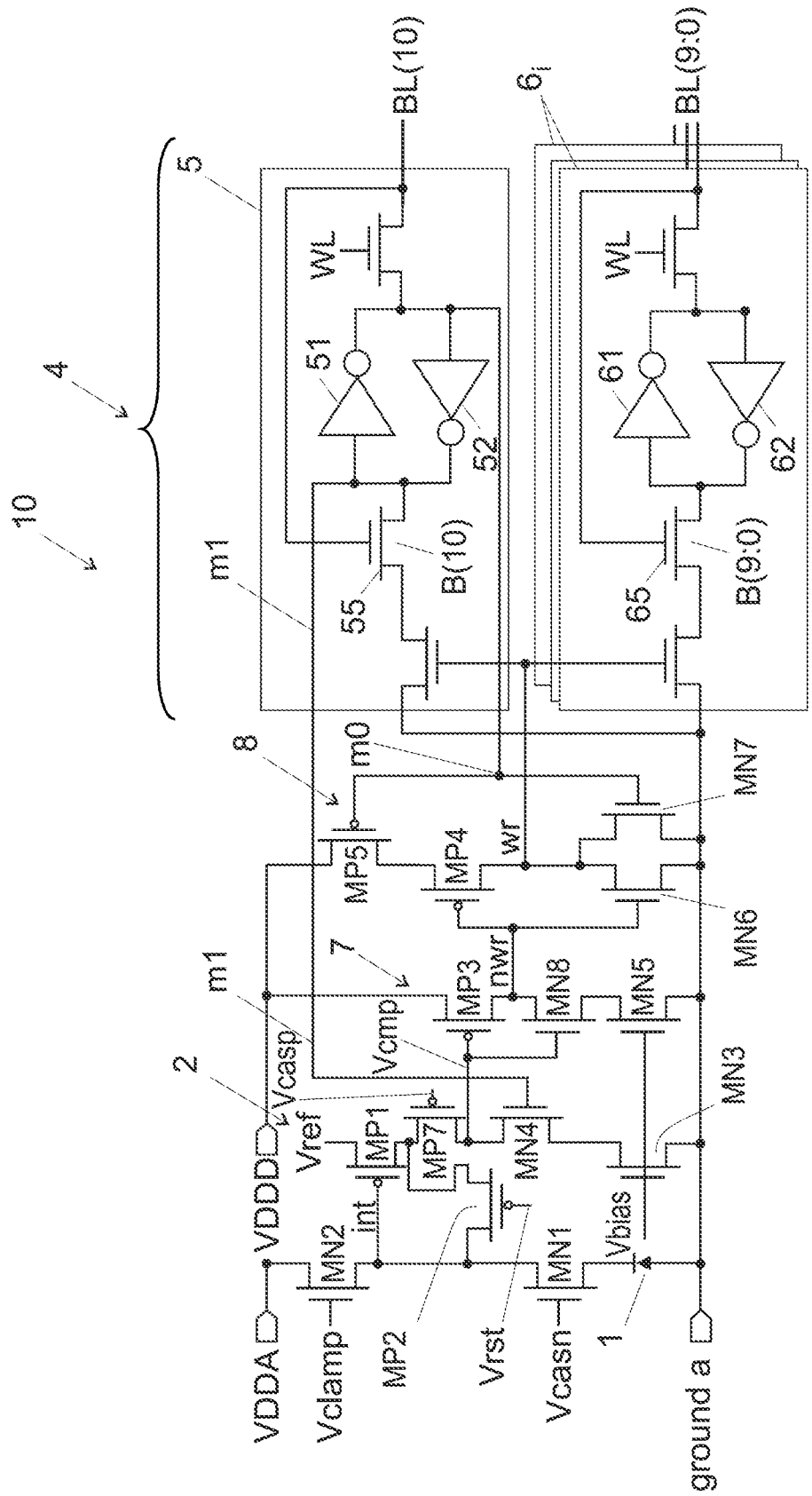
FIG. 6 shows a pixel circuit according to another embodiment of the invention.
Figure 7:
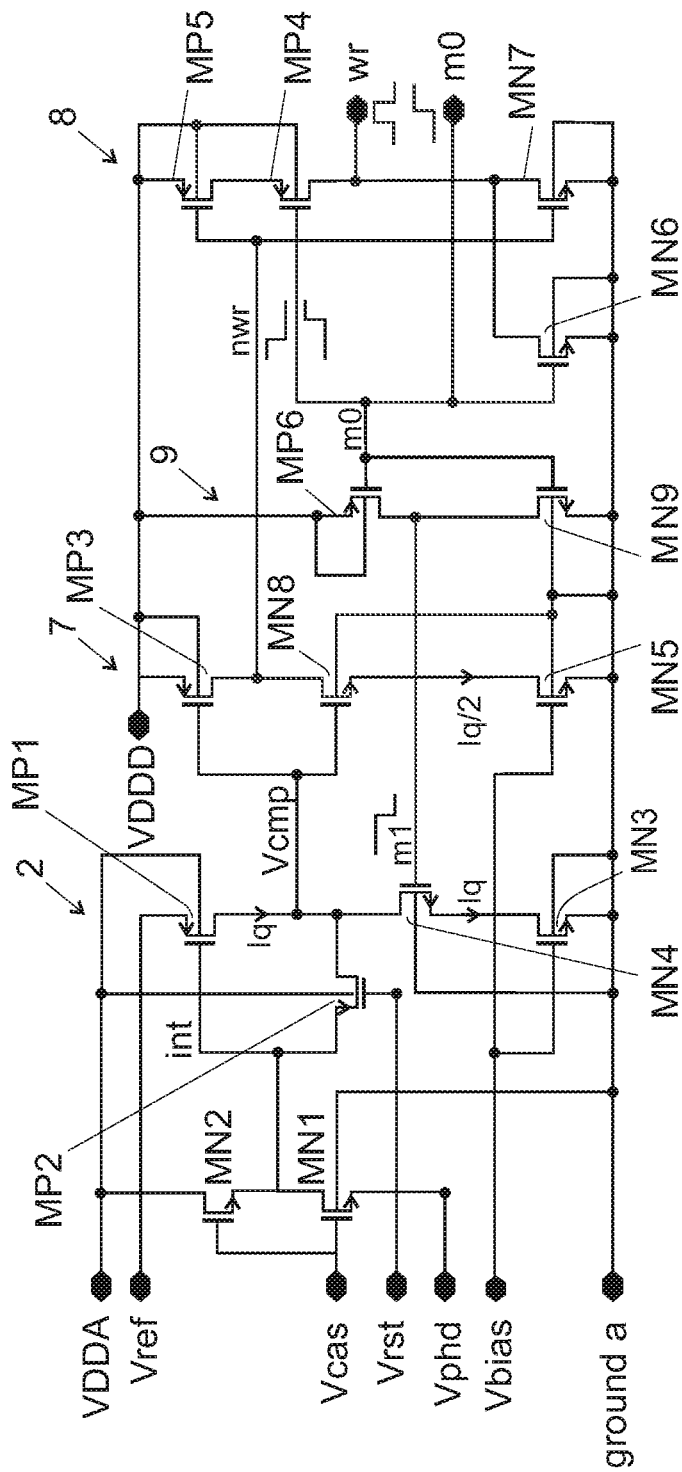
FIG. 7 shows a pixel circuit according to another embodiment of the invention.

FIGS. 6 and 7 show two embodiments of the invention. In those figures all the transistors are CMOS transistors, so that the image sensor comprising an array of such pixels is a CMOS image sensor. In particular, in those figures the reference "MN" indicates a transistor of N type and the reference "MP" a transistor of P type.

In other embodiments, the CMOS technology is silicon on insulator (SOI), fully depleted silicon on insulator (FDSOI) or deeply depleted channel (DDC).

However, the present invention is not limited to the technology CMOS and could be implemented with other technologies, as for example and in a non-limiting way the BJT technology.

Moreover, in one preferred embodiment, the transistors illustrated in FIGS. 6 and 7 operate in the "near-threshold region" or in the "sub-threshold region".

In this context, the expression "sub-threshold region" indicates that the gate-source voltage of the transistor is lower than the threshold voltage of the transistor, i.e. $|V_{GS}| < V_{Th}$.

In this context, the expression "near-threshold region" indicates that the gate-source voltage of the transistor is at or near the threshold voltage of the transistor, i.e. $|V_{GS}| \cong V_{Th}$. In other words, the difference between the gate-source voltage of the transistor and its threshold voltage is of some tenths of Volts at most.

The pixel circuit of FIG. 6 comprises:
a photodiode 1 for receiving a light beam representing a visual scene and for generating a photodiode current,
an integration node int, on which the photodiode current is integrated during an integration phase.

It must be noted that in this embodiment the pixel circuit 100 comprises a cascode transistor MN1, between the photodiode 1 and the integration node int, so as to raise the sensibility of the analog front-end.

Figure 1:
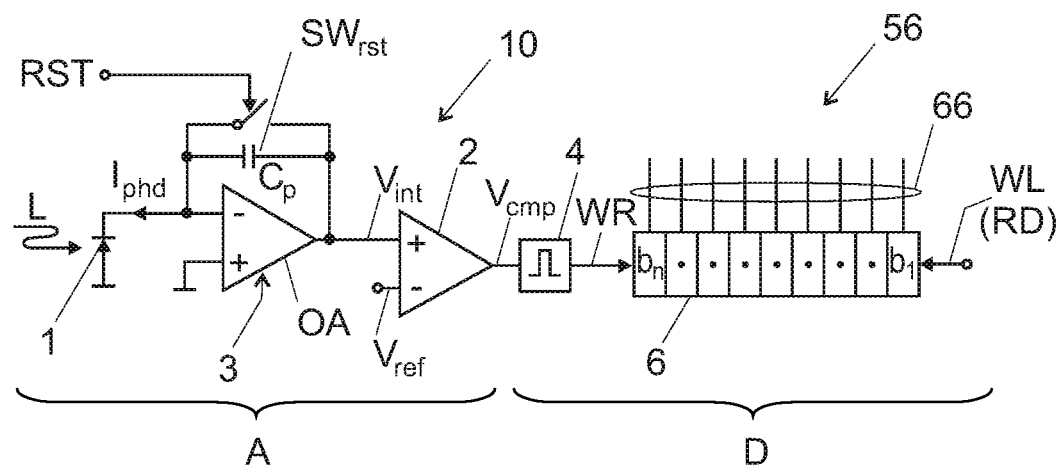
FIG. 1 shows a view of a known pixel circuit.

In fact the pixel circuit 10 illustrated in FIG. 6 is devoid of the integrator 2 of FIG. 1. If the photodiode 1 were connected directly to node int, the total capacitance on node int would include the parasitic capacitance of the photodiode 1. The cascode transistor MN1 shields the node int from the parasitic capacitance of the photodiode 1, thus reducing the total capacitance at node int, which increases the sensitivity of the front-end in term of µV/e-.

In the embodiment of FIG. 6, the pixel circuit 10 also comprises a clamp transistor MN2, in series with the cascode transistor MN1, i.e. connected between the integration node int and the (positive) supply voltage VDDA, so as to prevent a desaturation of the cascode transistor MN1. In another embodiment, the gate of the cascode transistor and the gate of the clamp transistors are connected together. In a further embodiment, the photodiode is directly connected to the integration node int without any cascode and clamp transistors. In a further embodiment, the photodiode (e.g. a pinned photodiode) is connected to the integration node by a transfer gate.

The transistor MP2 in FIG. 6 acts as the switch SWrst of FIG. 1. The transistor MP2 could be replaced by an NMOS transistor, with an adequate control of the gate of the NMOS transistor.

The comparator 2 of FIG. 6 comprises a first transistor (the current source transistor MN3) and a second transistor (the comparator transistor MP1). It comprises also the transistor MN4, acting as the switch SWc of FIG. 5, as it will be described.

It must be noted that a first transistor is of a first type (NMOS in the case of FIG. 6) and that the second transistor is of a second type different from the first type (PMOS in the case of FIG. 6). The types could be inverted depending of the type of the photodiode 1 (NMOS first transistor and PMOS second transistor if the photodiode is a n-well photodiode, PMOS first transistor and NMOS second transistor if the photodiode is a p-well photodiode).

In particular, the second transistor (the comparator transistor MP1) comprises a first terminal (the source terminal in FIG. 6) connected to the reference voltage Vref, a second terminal (the gate terminal in FIG. 6) connected to the integration node int, and it is in series with the first transistor MN3. In one embodiment, the fourth terminal (not illustrated) of the second transistor, is connected as well to the reference voltage Vref. The fourth terminal allows to modify a threshold voltage of the transistor. Then, in one embodiment, the fourth terminal is the bulk terminal of the transistor. In another embodiment, in particular if the transistor is realised in the technology silicon on insulator (SOI) or fully depleted silicon on insulator (FDSOI), the fourth terminal is the back gate terminal of the transistor. In another one embodiment in which the transistor comprises two gate terminals, the fourth terminal is one of the two gate terminals.

In another preferred embodiment, the fourth terminals of the second transistor (the comparator transistor MP1) and of the transistor MP2 are at a constant voltage, e.g. at the reference reset voltage or at VDDA. The first terminal of second transistor MP1 is at the same voltage of the fourth terminal during the reset phase and then at another voltage during the integration phase. This allows to raise the voltage range during the integration phase compared to the embodiment of the previous paragraph.

In the context of the present invention, the term "terminal" must be considered as a synonym of a node. It does not necessarily indicate that it is a pin that can be physically accessed by a user.

The comparator 2 is arranged to compare a voltage Vint at the integration node with the reference voltage Vref, and to generate a comparator output voltage Vcmp.

As mentioned, the comparator 2 comprises also a switch (implemented by the transistor MN4 in FIG. 6) placed between the first transistor MN3 and the second transistor MP1. This switch is arranged to be commanded by the voltage at the memory node m1 (or m0) of the memory element 5 so that the switch MN4 is open at the end of the pulse WR, so as to limit, in particular drastically limit, the consumption of static current of the pixel circuit 10 during the integration phase and also during the readout phase.

Figure 8:
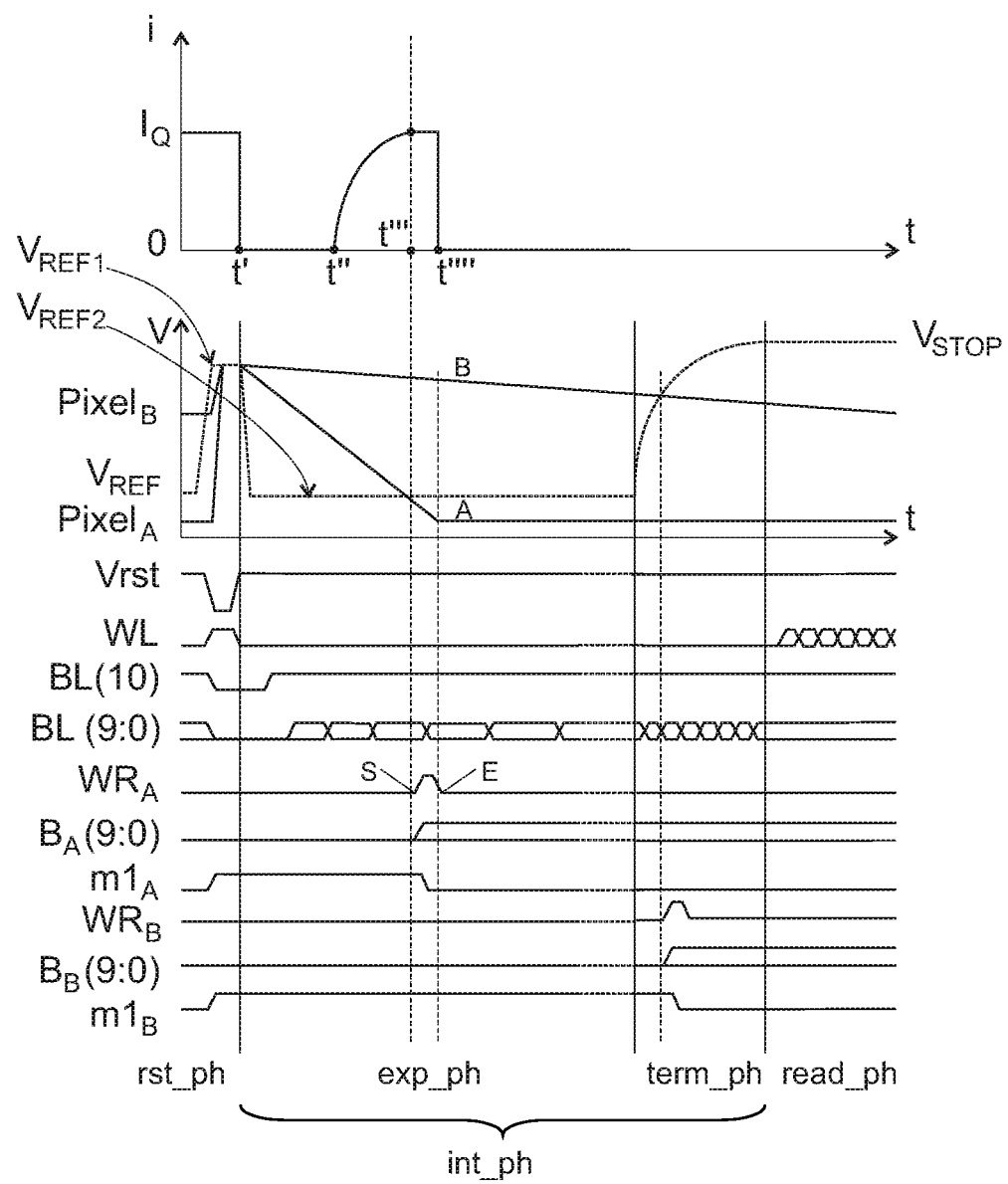
FIG. 8 shows a time diagram for the acquisition of an image.
Figure 9:
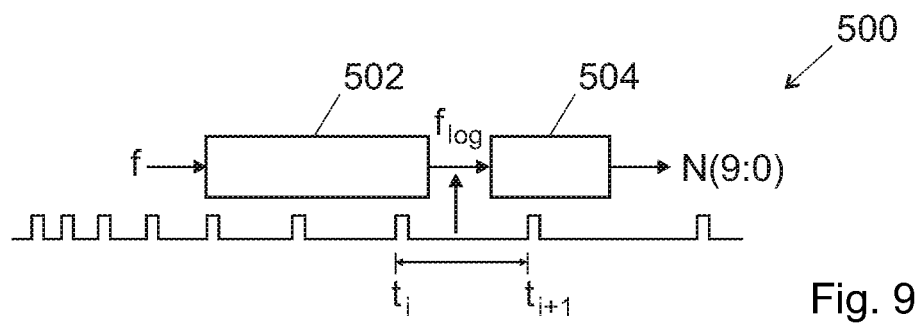
FIG. 9 shows a block diagram for the logarithmic code generation according to one embodiment of the invention.

FIG. 8, shows a time diagram for the acquisition of an image for two pixel circuits, named A and B. In FIG. 8 the reset phase rst_ph is followed by the integration phase int_ph and then by the read-out phase read_ph. The integration phase int_ph comprises an exposure phase exp_ph and a termination phase term_ph, as it will be discussed.

In the reset phase rst_ph, the integration node of each pixel is reset at a local black level by applying the desired black level ($V_{REF1}$) on signal $V_{REF}$, and by turning on transistor MP2. Simultaneously, the internal n-bit memory element of each pixel circuit is also reset by applying a positive pulse on signal WL while keeping BL in a low state, so that m0 is set low and m1 is set high.

In the embodiment of FIGS. 6 and 7, the transistor MP2 connects the gate and drain of MP1 during the reset phase. The reset level (black level) thus adapts to the local threshold variation of MP1 and variation of the current source, performing an auto-zero of the comparator. Therefore, in a preferred embodiment, pixels are not reset to a unique black level voltage, but to a local black level voltage incorporating the local process parameter variations so that all pixels have finally the same black level.

In the reset phase, the transistor MP1 of FIG. 6 is conducting a current, since the presence of Vbias at MN3 and the transistor MN4 is conducting as m1 has been set high during the reset phase.

During the exposure phase, transistor MP2 is turned off, signal $V_{REF}$ is set to the desired white level ($V_{REF2}$) lower than $V_{REF1}$ so that no DC current is flowing in MP1, and photocurrents are integrated on node int. Simultaneously, a code, in particular a code proportional to the logarithm of the time elapsed since the beginning of the exposure phase is applied on the bit-lines 66 $BL_{9:0}$, n being equal to ten in this case.

The transistor MP1 turns off as soon as $V_{REF}$ is a few hundred millivolts below its value during the reset phase. Therefore, IQ=0 already before that $V_{REF}=V_{REF2}$. When the pulse WR occurs, m1 goes low as BL(10) is high, thus IQ=0 during the rest of the exposure phase and the readout phase. A current lower or equal to IQ starts to flow (time t") in the comparator when the Vgs voltage of MP1 approaches the Vgs voltage of MP1 during the reset phase, and stops flowing when m1 switches from high to low state (t""), so as to limit, in particular drastically limit, the consumption of static current of the pixel circuit 10 during the integration phase and also during the readout phase.

At the beginning of the integration phase, since Vrst changes, the transistor MP1 is turned off and the signal $V_{REF}$ is set to a desired level ($V_{REF2}$ in FIG. 8) so that no DC current is flowing in MP1, and photocurrents are integrated on node int.

During the integration phase, the code on the bit-lines $BL_{9:0}$ evolves continuously, for example and in a not-limitative way proportionally to the logarithm of the time elapsed since the start of the integration.

In on preferred embodiment, the code delivered to all pixels is a Gray code to ensure that at a given time only one bit of the code is transiting from high to low or low to high level.

The time t" at which the current in the comparator 2 starts to raise is when the VGS (or VSG) of the second transistor MP1 of the comparator 2 approaches the VGS of MP1 during the reset phase. Since in one preferred embodiment the current of the transistor MN3 is of the order of magnitude of a few nA, probably the comparator switching point is for a VGS (or VSG) voltage smaller or very close to Vth.

The comparator 2 according to the invention is arranged so that the DC current in the comparator 2 is null at the beginning of the integration phase (instant t') and reaches the value of the polarization or source current IQ generated by the current source MN3 at the instant t''' in which the voltage at the integration node int for the pixel circuit A reaches the reference voltage Vref, corresponding to the time of generation of the writing pulse signal WR.

The time between t''' and t"", wherein during the integration phase there is a static power consumption, corresponds to the length of the pulse WR (t''' corresponds to the start S of the pulse and t"" with its end E) and it is in the order of magnitude of tens of nsec.

The period between the time t", wherein the current starts to augment, and the time t''', wherein it is equal to IQ, depends on the current from the photodiode 1, and then by the illumination received by the pixel circuit.

In the present example, pixel circuit A reaches the white level before the end of the exposure phase and stores in its internal memory the state of $BL_{9:0}$.

The photocurrent of pixel circuit B is too low to reach the white level $V_{REF2}$ before the end of the exposure phase, so that its memory does not hold a valid data at the end of this phase. In order to convert the voltage of pixel circuit B, the exposure phase exp_ph is followed by a ramp phase, where signal $V_{REF}$ is modified (in the illustrated example increased, e.g. exponentially increased) so as to reach a percentage (e.g. 10%) of the white level, then linearly put to the black level ($V_{STOP}$). With this scheme, exponential encoding of data is performed over one more decade than what would be achieved with a fixed $V_{REF}$. In another embodiment, the ramp is linear.

In other words, in one embodiment, the reference voltage has a first fixed value during the reset phase and a second different fixed value during the exposure phase. Moreover, in another embodiment, the reference voltage is varied in time, e.g. according to a ramp, during the termination phase, so as to convert the voltage of a pixel (the pixel B in FIG. 8) which did not reach the reference voltage during the exposure phase.

The comparator output Vcmp may be disrupted during the transition between the reset phase and the exposure phase. To prevent this from causing a pixel to memorize an incorrect code, in one embodiment a user can set a waiting time between the end of the reset phase and the time at which the $BL_{10:0}$ are not all at low level to prevent them to store a wrong state.

Reverting to FIG. 6, as discussed the illustrated pixel circuit 10 comprises also a reset switch, here implemented by the transistor MP2, allowing to reset the voltage at the integration node to the black level voltage during the reset phase, which precedes the integration phase. In an embodiment, the pixel circuit 10 also comprises a cascode transistor MP7 between MP1 and MN4. This cascode transistor increases the gain of the comparator by shielding the drain-gate parasitic capacitance of MP1 from node Vcmp. Without MP7, the sharp positive voltage step on Vcmp couples to the integration node int through the parasitic gate-drain capacitance of MP1, thus reducing the voltage slope of node int when the comparator Vcmp switches from a low state to a high state.

During the reset phase, the current in the comparator MP1, (MP7), MN4, MN3 is the current of the current source MN3, as visible in FIG. 8. Therefore, there is also a static power consumption in the reset phase. However, the reset phase is not long, in the order of magnitude of a few microseconds.

The pixel circuit of FIG. 6 comprises between the comparator 2 and the digital memory 5, 6i also an inverter 7 and a logic port (or logic gate) 8 (a NOR in the illustrated example). The inverter 7 comprises the current source MN5 and the transistors MP3 and MN8. The logic port NOR 8 comprises the transistors MN6-MN7-MP4-MP5.

In the embodiment of FIG. 6, the writing pulse generator 4 comprises the logic port (or logic gate) 8 (a NOR in the illustrated example) and the memory element 5, with m0 which is low while node nwr is high; once nwr goes low, signal wr goes high, setting m0 high, which sets signal wr low.

When the output voltage Vcmp of the comparator 2 is in the first state (e.g. low), one of the two transistors MN8/MP3 (MN8 in this case) is open and therefore there is no static current consumption in the inverter 7. When the output voltage Vcmp of the comparator 2 is in the second state (e.g. high) the other of the two transistors MN8/MP3 (MP3 in this case) is open and therefore there is no static current consumption in the inverter 7. During the transition from the first state to the second state of the output voltage Vcmp of the comparator 2, the current in the inverter 7 is the current defined by MN5, which is limited. The inverter 7 is therefore a current limited inverter.

The input of the inverter 7 is the output of the comparator 2 (the voltage Vcmp) and its output is the signal nwr which is the complement of Vcmp. It must be noted that in the illustrated embodiment the current source MN3 of the comparator 2 and the current source MN5 of the inverter 7 share the voltage Vbias at their gates. The voltage Vbias is generated globally for all pixels by a diode connected transistor, or by a transistor arrangement (not illustrated here) biased by a current.

The logic port NOR 8 combines the signal nwr and the signal m0 from the memory element 5 so as to obtain the writing pulse signal wr. In one preferred embodiment, the current of the current source MN5 of the inverter 7 is a fraction of the current of the current source MN3 of the comparator 2. For example, if the current of the current source MN3 is IQ, the current of the current source MN5 of the inverter 7 is IQ/2, or IQ2/5, etc.

For clarity reasons, some elements as the supply voltage of the digital part of the pixel circuit, etc. have not been illustrated in FIG. 6. In a preferred embodiment, the fourth terminal (e.g. the bulk terminal) of transistors MP1-MP7 are connected together.

FIG. 7 shows another pixel circuit 10 according to another embodiment of the invention.

In this embodiment, the photodiode (not illustrated) is connected to node Vphd. In this embodiment a cascode transistor MN1, between node Vphd and the integration node int, allows to raise the sensibility of the analog front-end by shielding node int from the capacitance of the photodiode.

The reset transistor MP2 and the comparator MN3-MN4-MP1 are similar to those illustrated in FIG. 6.

In the embodiment of FIG. 7, the inverter 7 comprises the transistors MN5-MP3-MN8, as in FIG. 6. It is therefore a current limited inverter.

In the example of FIG. 7, the current in the inverter 7 is a half of the current IQ in the comparator 2. However, this embodiment is not limitative and other ratios between those two currents can be set by the skilled person.

According to another embodiment of the invention, between the inverter 7 and the logic port NOR 8 there is another inverter 9 (illustrated in FIG. 7), comprising the transistors MP6-MN9. It allows to generate the voltage commanding the switch transistor MN4, starting from the voltage at the node m0.

According to another embodiment of the invention, the fourth terminal (e.g. the bulk terminal) of the reset switch transistor MP2 is connected, preferably directly connected, with the fourth terminal of the transistor MP1 of the comparator 2, and in the example of FIG. 7 those fourth terminals are set at the supply voltage VDDA of the analog part of the pixel circuit 10. The sharing of the fourth terminals of the transistors MP2 and MP1 allows to raise the integration phase of at least 30%, as the body effect is limited or suppressed.

In another example, not illustrated, in order to accelerate the working of the pixel circuit 10, the voltage Vrst commanding the reset switch MP2 is set to a first voltage during a first part of the reset phase. In the second part of the reset phase, which follows the first part, this voltage is changed to a second voltage so as to reach a second different value in order to limit the mismatching of the charges' injection when the reset switch is open. The first Vgs voltage of MP2 is larger than the second Vgs voltage of MP2, so as to ensure a quick reset of the integration node int in the first phase and minimize charge injection when MP2 turns off.

As discussed, a number is written in the n-bits part of the digital memory of the pixel circuit according to the invention. In one preferred embodiment, this number is the number of periods of a clock generated by a clock generator (for example the oscillator 700 of FIG. 4). In fact, the pixel circuit cooperates with a counter module (reference 500 in FIG. 4) for counting this number of periods of the clock having elapsed since the beginning of the integration phase, and for delivering this number as a binary code, e.g. a Gray code.

As discussed, once Vref is reached, the content of a n-bit digital word (for example BL(9:0)) distributed to all pixels in parallel is stored in the pixel memory. In the main functioning mode, this digital word evolves over time to code the logarithm of the time elapsed since the beginning of the integration. Once photo-current integration is terminated, the n-bit words stored in the pixel array are read-out.

The last memory bit (for example BL(10)) is used to generate a pulse on signal WR when node int reaches Vref. After reset, BL(10) is low. During photocurrent integration, BL(10) is set high. When node cmp goes high, node WR goes high, so that node m1 goes low. This, in turn, makes node WR go low.

In one preferred embodiment, the logarithmic code is generated by a state machine. The principle is illustrated on FIG. 10, in which an example of a logarithmic counter is shown. This logarithmic counter can be used as the counter 500 of FIG. 4. A first counter 502 clocked by the system clock (reference 700 in FIG. 1), e.g. at a frequency of 50 MHz, generates pulses at exponentially increasing intervals to clock a second counter 504. The output of the second counter 504 is therefore proportional to the logarithm of the integration time.

An example of equation used to generate this sequence of pulses is given by the following formula:

$$t_{i+1} = t_i + 1 \text{ if } t_i/N = 0 \qquad (1)$$

$$t_{i+1} = t_i + (t_i/N) \text{ if } t_i/N > 0 \qquad (2)$$

Wherein $t_i$ is the time of the start of the pulse i, $t_{i+1}$ is the time of the start of the successive pulse i+1 and N is an integer number, 64 in one preferred embodiment. In one preferred embodiment, ti/N is an integer number (therefore ti/N can take the values 0, 1, 2, . . . ).

At a given time t, the interval to the next pulse is equal to 1/N of t (1.56% for N=64). The interval between two successive pulses is a multiple of the clock period. When the binary counter 504 starts to count, it is not possible to add 1/N of one clock period. Therefore, initially, the interval between two pulses is equal to one clock period, and then it progressively becomes proportional to the logarithm of the integration time, as illustrated by the curve dt in FIG. 10.

Figure 10:
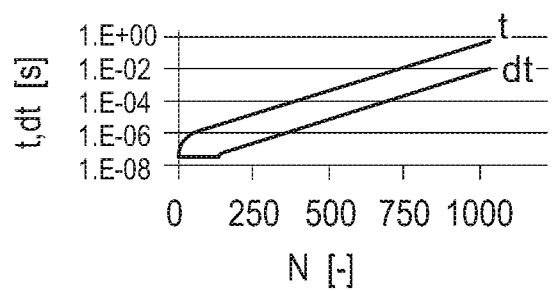
FIG. 10 shows a graphic illustrating the relation between the output code of the counter of the image sensor according to one embodiment of the invention and the integration time.

The resulting relation between the output code of the counter 504 and the integration time is given by the curve t in FIG. 10. Initially there is a linear relation between the counter output and the integration time. Then, within a few microseconds, the relation between the output code and the integration time becomes logarithmic. The counter 504 can also be clocked by an arbitrary signal generated for example by the microcontroller 3000 of FIG. 4 in order to generate any arbitrary relation between the integration time and the output code of the counter 504.

The microcontroller 3000 of FIG. 4 cooperates with the image sensor 1000, in particular with its image read-out module, to perform ultra-low power image acquisition and processing according to at least one of the two the following procedures:

a subsampling procedure on the rows and/or the columns of the pixel array 100 of the image sensor 1000. In this mode, only the subsampled pixels are reset in the reset phase, thereby saving the static power consumption in the reset phase rst_phase, and the switching power consumption in the integration phase, int_phase, a motion detection procedure, in which the microcontroller 3000 is arranged to compute the difference between an acquired image and the preceding acquired image and if this difference is not null the microcontroller 3000 is further arranged to compress the acquired image before write the compressed acquired image in said memory.

In one preferred embodiment, the rows of the pixel array which are not read in subsampling mode are not reset. For the columns which are not read in subsampling, BL(10) is kept high during the reset phase in order not to reset the bit 10 of the memory. As bit 10 is not reset, there is no current flowing in the comparator 2 during the reset phase for these pixels. In addition, there is no transition of the comparator during the integration phase as transistor MN4 in FIG. 6 is open and therefore no writing pulse WR.

Those two procedures, which can be used in alternative or in combination, are further detailed in the following:

Sub-sampling on row and column (thumbnail image) is specifically provided to bring ultra-low power mode for always-on operations, as the pixels not used are not reset, thereby saving the static power consumption in the reset phase and the switching power in the integration phase. The available ratio is 1/n (e.g. 1/2, 1/4 and 1/8) resulting in thumbnail images of lower resolution. Sub-sampling on rows and columns can be programmed separately.

In one preferred embodiment, the pixel array scan directions are arbitrary (pixels are addressed like a memory). The random accessibility of pixel via the serial interface allows any kind of region of interest (ROI) to be extracted.

Figure 11:
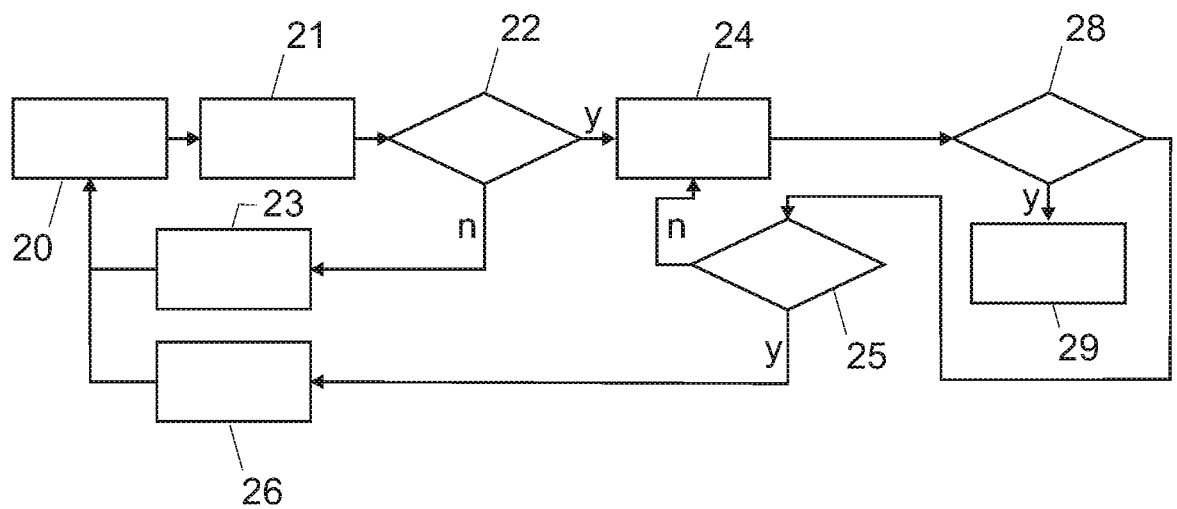
FIG. 11 shows a flow chart indicating some steps that according to one embodiment of the invention allows to implement an ultra-low power vision system.

As illustrated in FIG. 11, according to one embodiment, once an image is acquired (step 20), e.g. a sub-sampled image, in one embodiment the difference, in particular the absolute difference, between this image and a reference sub-sampled image is computed by the microcontroller 3000 of FIG. 4 (or by an internal micro-controller) (step 21 or "change detection"). If the difference is lower than a threshold for all pixels of the sub-sampled image (step 22), this is considered as a 'no-change' event, and else, if the difference is larger than said threshold for any pixel, a 'change' is detected in the scene. When there is no-change, the image sensor and the microcontroller goes into a sleep mode to save power for a certain period of time before acquiring and processing a new image, e.g. a sleep period of 500 msec (step 23). The sleep period can be determined such that the overall system acquisition and processing speed is constant (e.g., 1 frame per second).

If on the contrary the difference of any pixel is above a given threshold, in one preferred embodiment a full resolution image is acquired. In one embodiment, the parts of the acquired image, for which the difference is larger than said threshold, are compressed, and the corresponding pixels of the reference sub-sampled image are updated with the value of the corresponding pixels of the full resolution image. The resulting compressed bit stream is written in a memory (not illustrated) embedded in the camera device of FIG. 3 (step 24). The reference image is equivalent to the sub-sampled version of the last uncompressed image of the compressed image sequence stored in said memory, which can be within the microcontroller or external to it.

In another embodiment, the image sensor acquires a full resolution image, but only a sub-sampled image of the full resolution image is transferred to the microcontroller, said microcontroller computes the difference, in particular the absolute difference, with the reference sub-sampled image and transfers the full resolution image only if the difference between said sub-sampled image and said reference sub-sampled image is higher than a threshold for any pixel of the sub-sampled image. Compared to the approach introduced in previous paragraph, this prevents acquiring a new image every-time a change is detected.

In one preferred embodiment, the microcontroller does not have enough internal memory to store a full resolution image as a whole and process it there. In this case, the image is transferred from the image sensor to the microcontroller and processed in the microcontroller in small parts, for instance, only a certain number of rows (e.g. 8 rows) is transferred at a time. The microcontroller compresses said parts where changes are detected and write them in a memory of the camera device.

In one preferred embodiment, simultaneously to the compression of part i, the microcontroller writes in the memory of the camera device the compressed part i−1.

After having compressed part i and written part i−1, the microcontroller checks if the memory is full (step 28). If it is full, the image acquisition and processing process is stopped (step 29). If it is not full, the microcontroller checks if the compression and/or the storing of the image in the memory of the camera device has been completed (step 25). If it has been completed, the system goes into a sleep mode (step 26) before starting a new acquisition. If it has not been completed, the microcontroller reads and compresses the part i+1 while simultaneously writing the part i in the memory of the camera device.

Figure 2:
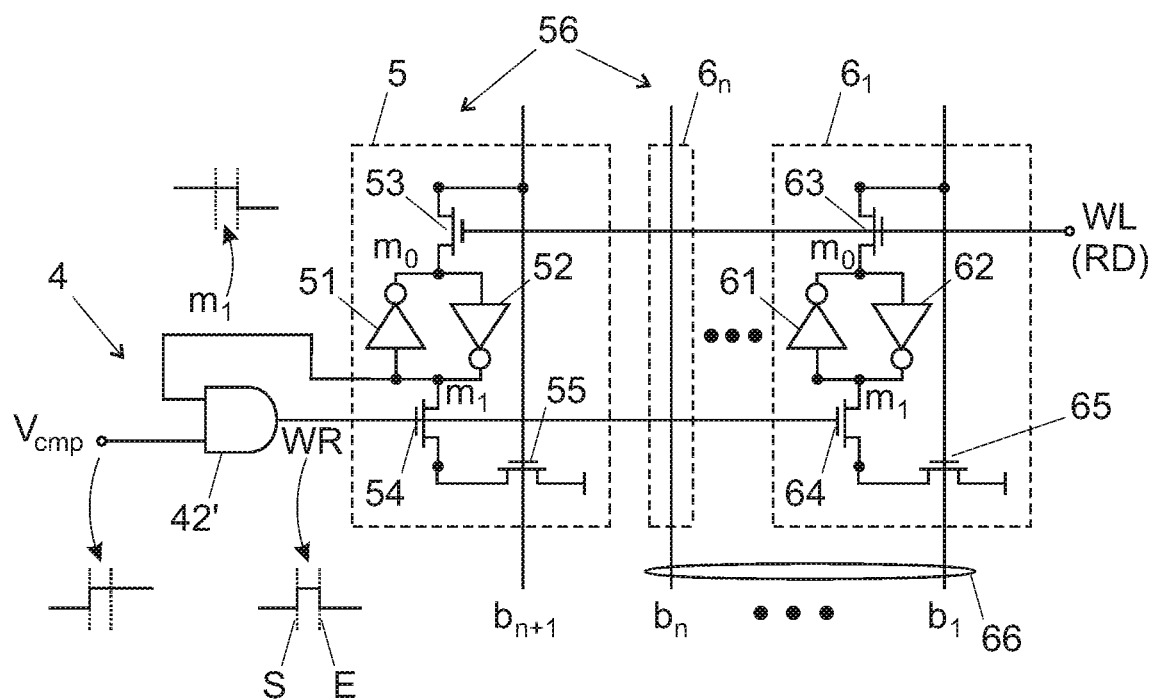
FIG. 2 shows a view of the digital part of the known pixel circuit of FIG. 1.

In one preferred embodiment, the optical module 5000 of FIG. 2 comprises an innovative micro-optical component such as described in patent application EP18182654.6 filed by the present applicant.

KTC noise is the (thermal) noise of a switch frozen on a capacitor when the switch opens. The rms value is sqrt(KT/C), where K is the Boltzmann constant 1.32E-23, T is the absolute temperature and C is the capacitance of a node, the sense node.

A pinned photodiode is a buried junction photodiode formed by a double p+np junction. The p+ surface implant (pinning implant or layer) significantly reduces the dark current with respect to a photodiode devoid of such a layer (or "standard" photodiode). The doping concentration of the substrate, the n-type diffusion and the p-type surface implant are chosen so as the n-type diffusion is fully depleted. They offer the advantage to have a very low leakage current and a reset phase immune of KTC noise, due to the fact that they are fully depleted thanks to the pinned layer. The leakage current of a pinned photodiode can be orders of magnitude lower than the total leakage current of the junctions connected to the integration node int.

At low illumination (for example less than a few lux, e.g. less than 1 lux), the leakage current of the junctions connected to the integration node int becomes significant compared to the photocurrent, limiting the low light ability of the sensor. In traditional image sensors, this is solved by integrating the photocurrent in a pinned photodiode, then resetting the integration node int just before transferring charges from the pinned photodiode to the sense node by activating a transfer gate connected to the pinned photodiode.

In one embodiment, the pixel circuit according to the invention comprises a pinned photodiode with a slightly modified sequencing of the image acquisition, so as to offer a low light imaging mode with a reduced dynamic range.

Figure 12:
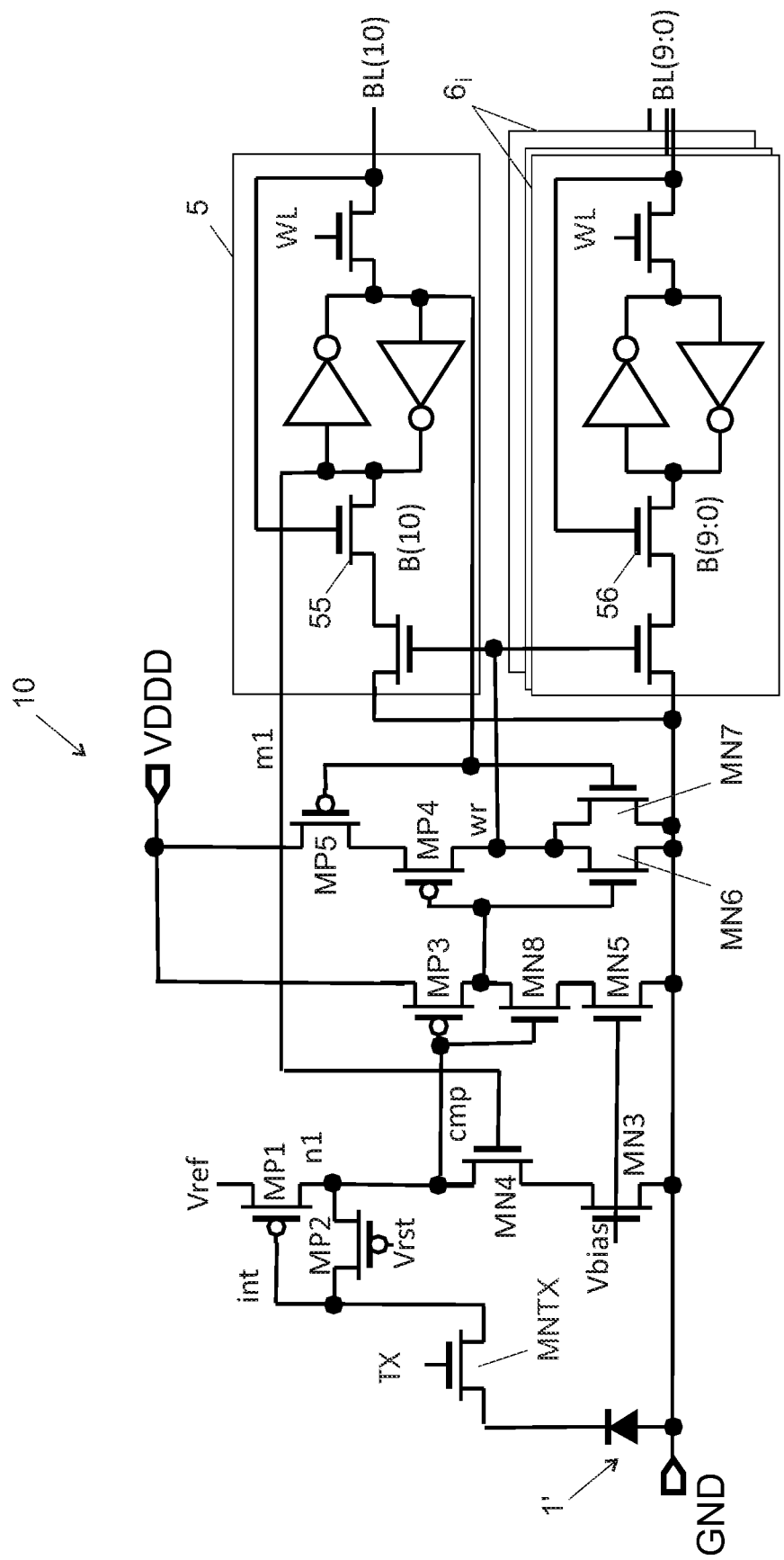
FIG. 12 shows a pixel circuit according to another embodiment of the invention.

An example of such embodiment is illustrated in FIG. 12: in the illustrated example, the pixel circuit comprises a pinned photodiode 1', a transistor MNTX (transfer gate) with one side connected to the pinned photodiode 1' and the other side connected to the gate of MP1, a transistor MP2 with source and drain connected between the drain and gate of MP1, a switch transistor MN4 with the drain connected to the drain of MP1 and the source connected to the drain of MN3 which acts as a current source. The rest of the circuit is similar to the embodiment of FIG. 6.

Figure 13:
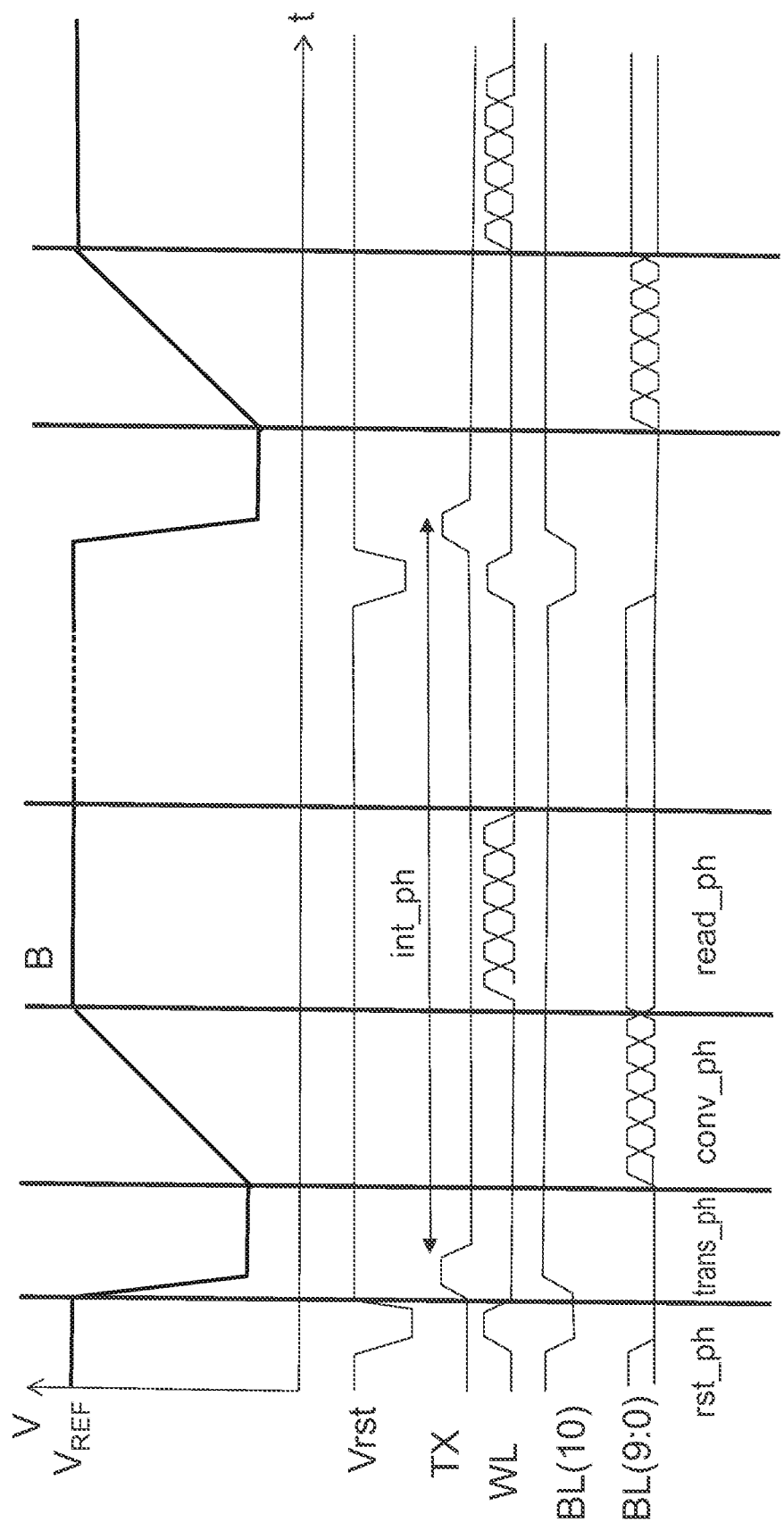
FIG. 13 shows a time diagram for an acquisition of an image by the pixel circuit of FIG. 12.

At low illumination, it is important to maximize the exposure time. The use of a pinned photodiode 1' enables to perform photocurrent integration of frame i while converting and reading out the frame i−1. This is illustrated in FIG. 13. The integration node int and the memory are first reset by applying a voltage corresponding to the black level on node Vref connected to the source of MP1, setting Vrst low, BL(10:0) low and WL high during a reset phase (rst_ph).

Setting Vrst low resets the integration node int to a local black level, thus performing an auto-zero of the comparator formed by MP1, MN3 and MN4 which cancels pixel-to-pixel voltage threshold variations. Then, during a transfer phase (trans_ph), BL(10) and Vrst are set high and slightly later a voltage corresponding to the white level is applied on node Vref. Following this, the voltage at the node TX (gate of the transistor MNTX) is set high to transfer charges from the pinned photodiode 1' to the integration node int, thus emptying the pinned photodiode 1' and making it ready for the next exposure phase.

Subsequently, at a conversion phase (conv_ph), a ramp is applied on Vref while the code on BL(9:0) evolves with time to convert the voltage on the integration node int to a digital value and store it in the pixel memory. The pixel memories are then readout in a readout phase (read_ph) row by row on BL(9:0) by setting the signal WL of the corresponding row high.

To have an exposure time shorter than the readout time, the pinned photodiode 1' can be reset at any time during the readout phase by setting Vrst low and TX high.

Figure 14:
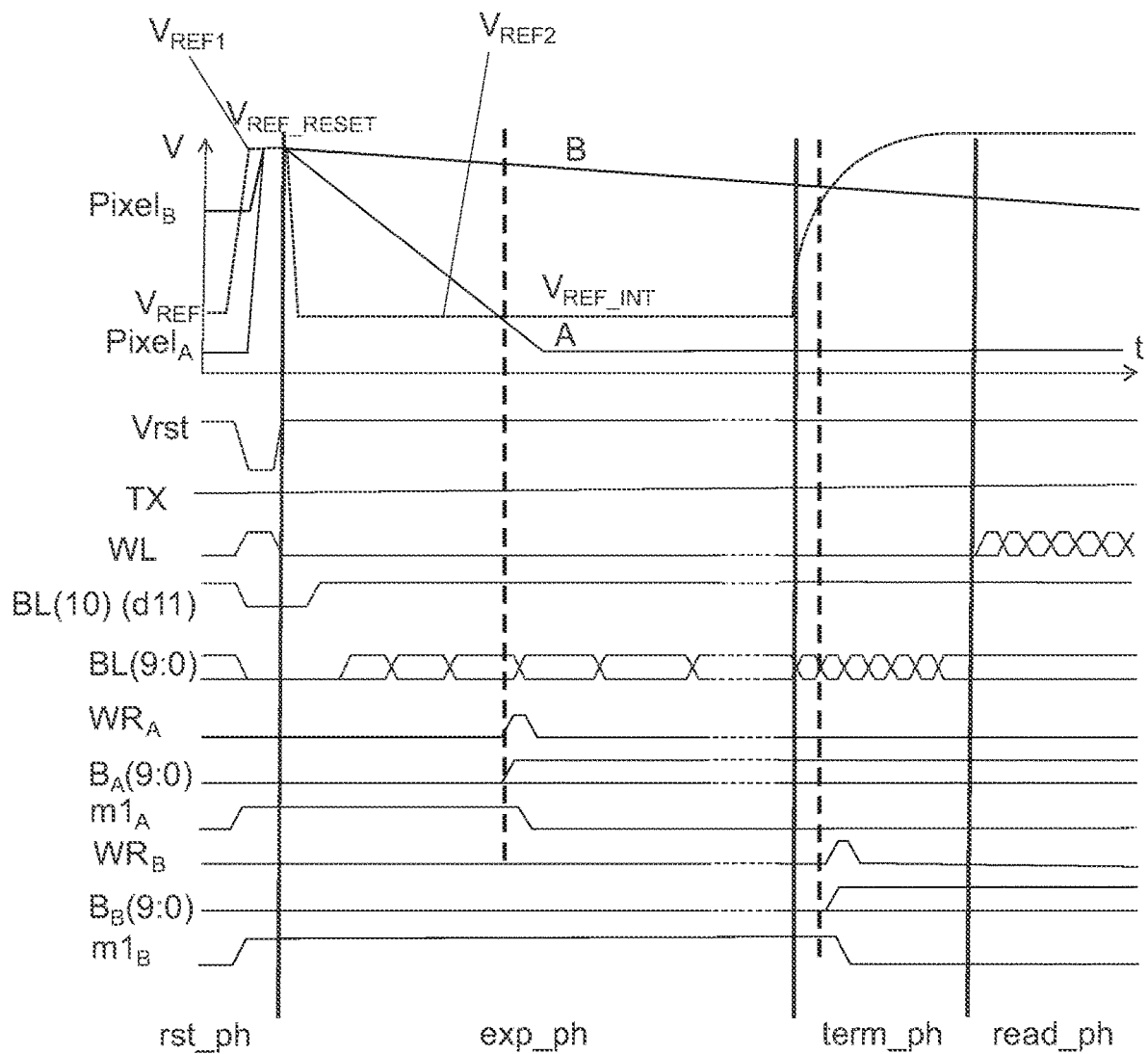
FIG. 14 shows another time diagram for an acquisition of an image by the pixel circuit of FIG. 12.

With sufficiently high illumination (for example more than 10 lux), the pixel circuit can be operated with TX kept high all the time, as illustrated in FIG. 14. In this case, the behavior of the pixel circuit of FIG. 12 is similar to the behavior of a pixel circuit with a "standard" (i.e. not pinned) photodiode 1.

Figure 15:
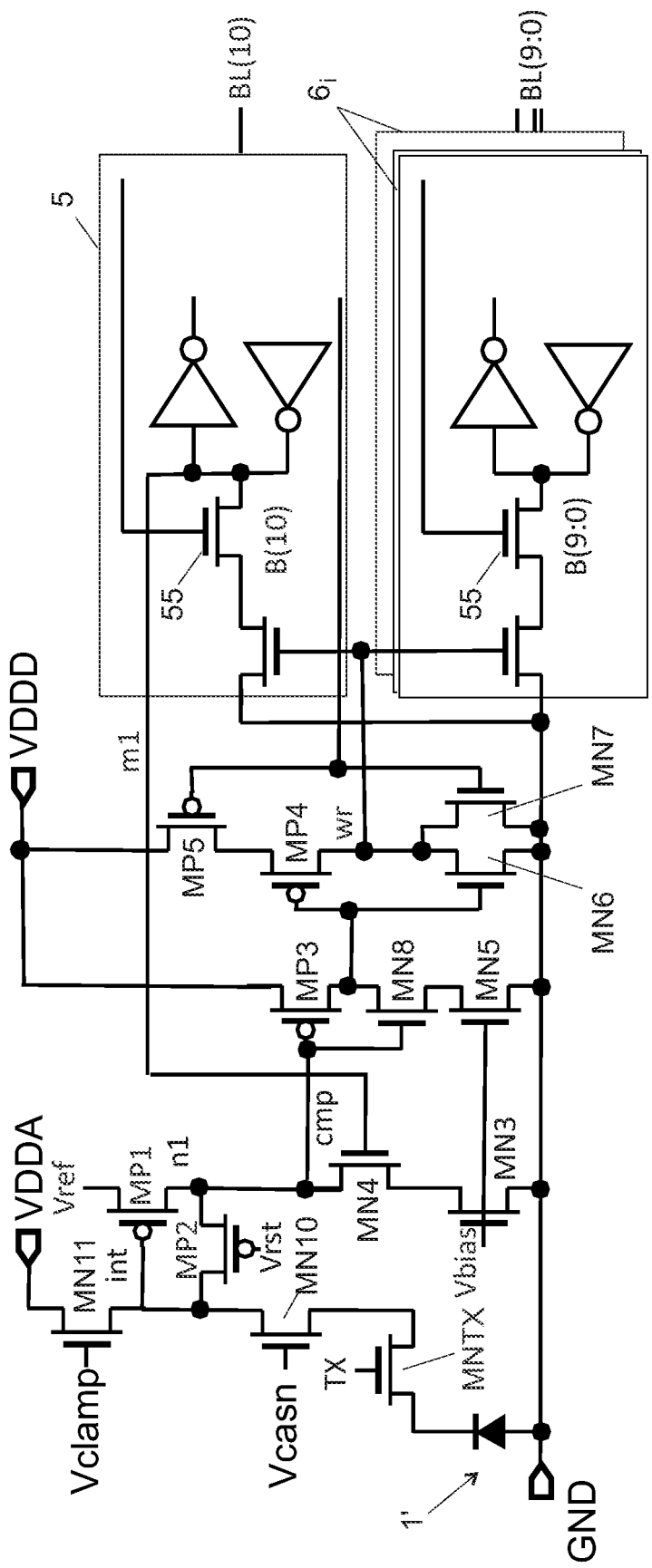
FIG. 15 shows a pixel circuit according to another embodiment of the invention.

Another embodiment of the pixel circuit is illustrated in FIG. 15: in this case a cascode transistor MN10 has been added between the transistor MNTX and the integration node int, to shield the integration node int from the parasitic capacitance of the pinned photodiode 1' when it is operated like a "standard" photodiode, by keeping TX high all the time. In this embodiment, when the pixel circuit is operated in low light conditions as illustrated in FIG. 13, the gate of the cascode transistor MN10 is set to a high voltage, preferably Vcasn=VDDA. The clamp transistor MN11 connected between the integration node int and VDAA prevents the integration node int to drop below the saturation voltage of transistor MN10.

Figure 16:
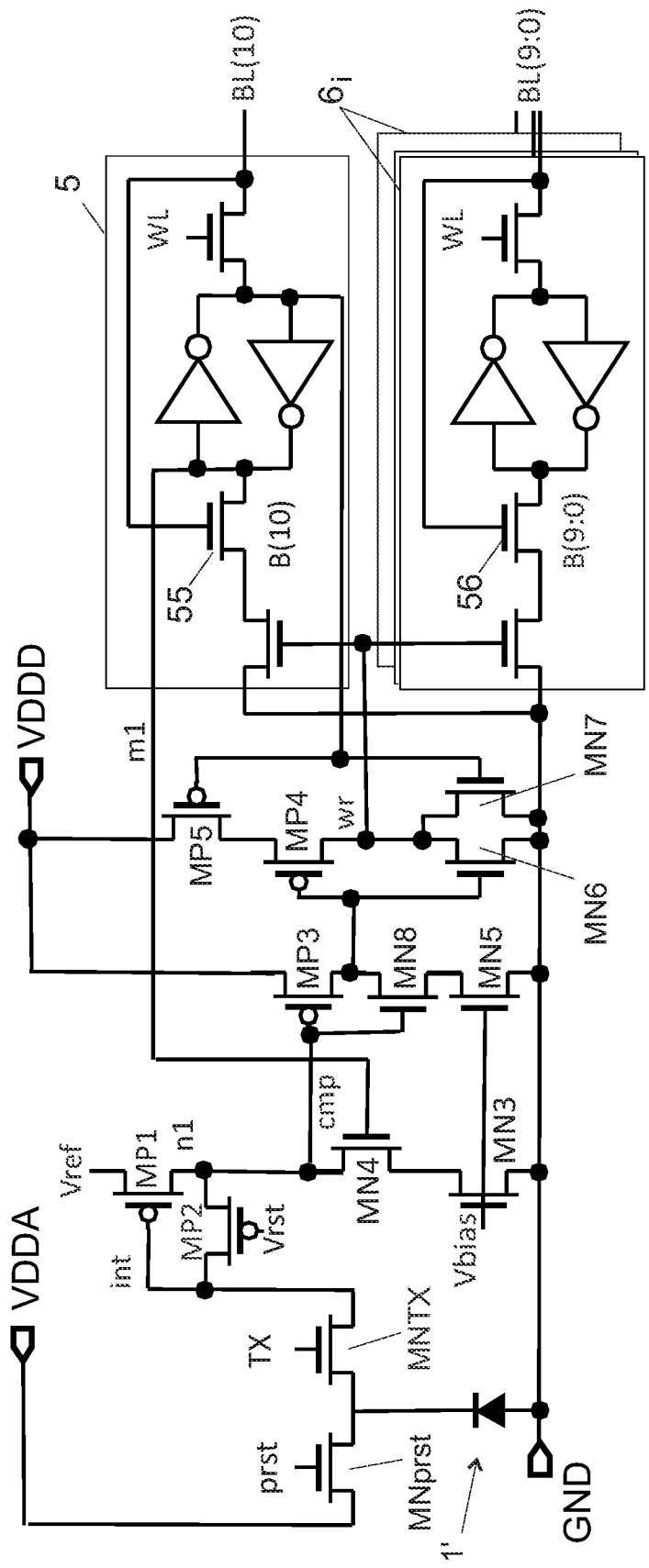
FIG. 16 shows a pixel circuit according to another embodiment of the invention.

In another embodiment, illustrated in FIG. 16, a second transistor MNprst (second transfer gate) is connected between the pinned photodiode 1' and a high voltage node (VDDA in the illustrated example), to enable to reset the pinned photodiode 1' independently of the time when charges are transferred to the integration node via the transfer gate controlled by TX. This second transfer gate MNprst can also be used for anti-blooming, by setting an adequate voltage on this second transfer gate during the photocurrent integration phase.

The embodiments of FIGS. 15 and 16 can be combined. Furthermore, the embodiments of FIGS. 15 and 16 can include a pmos cascode transistor between MP1 and MN4 as in FIG. 6.

The KCT noise affects the sense node of a pixel when this sense node is reset. If not canceled, KTC noise limits the SNR. For example, with a sense node capacitance of 1 fF, the rms value of the KTC noise is 2 mV at 300° K, corresponding to a charge of 12 electrons.

Correlated double sampling (CDS) is used in most of image sensors to cancel the KTC noise. It consists in reading the pixel value a first time after having reset the sense node, then a second time after transfer of the charges accumulated in the pinned photodiode to the sense node, and finally taking the difference between these two values. As the sense node is not reset between the two successive readings, the KTC noise is the same for the two samples, so that it is cancelled when taking the difference.

Figure 17:
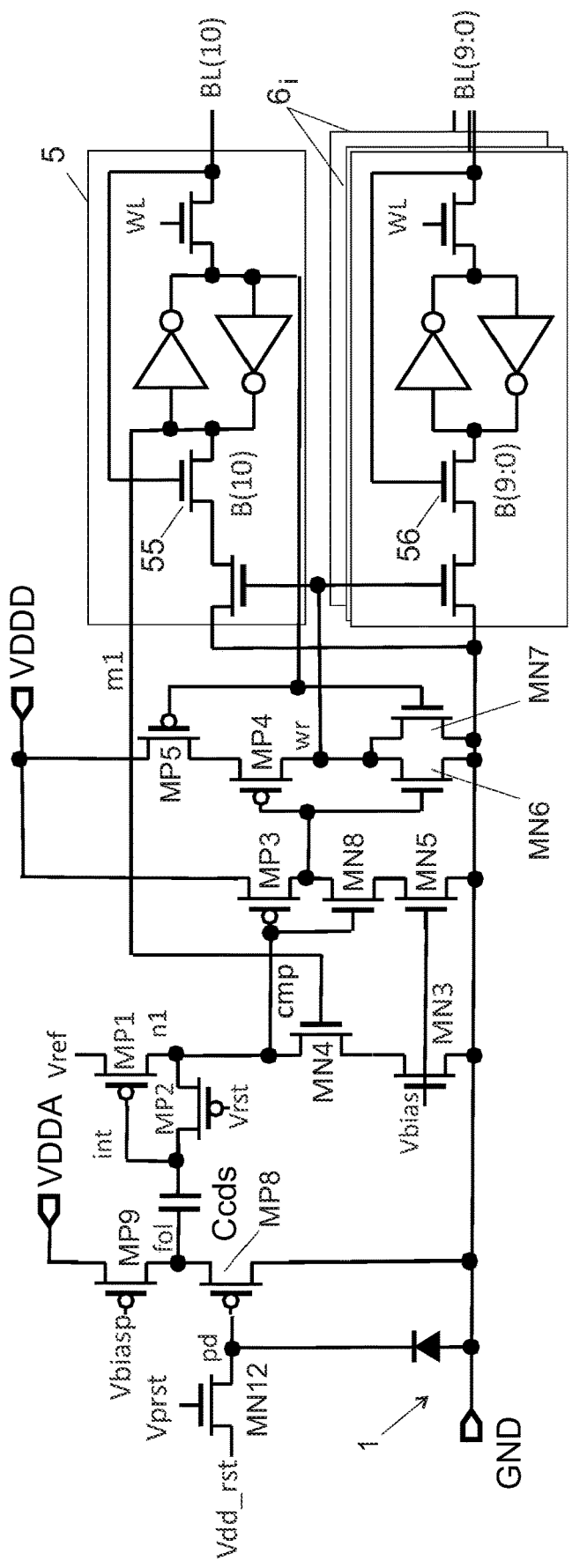
FIG. 17 shows a pixel circuit according to another embodiment of the invention.

FIG. 17 shows an embodiment of the pixel circuit, which enables to implement in-pixel CDS. The gate of MP1 is connected to the first terminal of a capacitor Ccds. The second terminal of Ccds is connected to the output of a (pmos) source follower MP8. A "standard" photodiode 1 is connected to the gate of the source follower MP8 as well as to the source of an nmos transistor MN12 used to reset the photodiode at a defined voltage. The source of MP8 is connected to the drain of a pmos transistor MP9 acting as a current source.

The capacitance of the capacitor Ccds is chosen to be much larger than the capacitance of the sense node (for example 10 times larger). Its function is to store the KTC noise of the sense node.

Figure 18A:
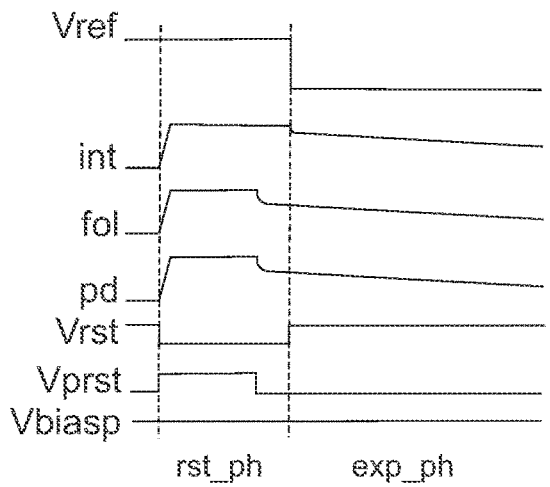
FIGS. 18A and 18B show two time diagrams for an acquisition of an image by the pixel circuit of FIG. 17.
Figure 18B:
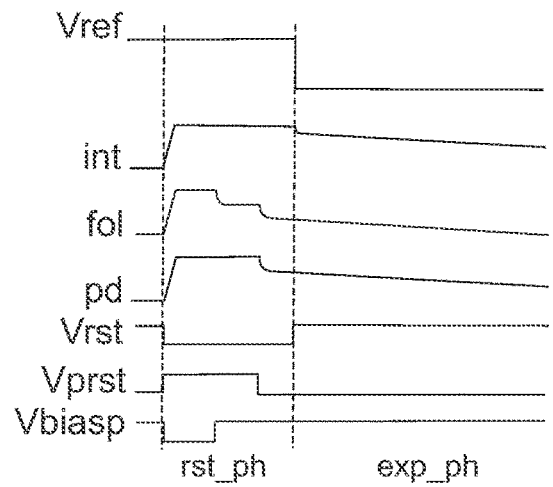

The sequence of control signals to implement in-pixel analog CDS is illustrated on FIGS. 18A and 18B. First, the photodiode is reset at voltage vdd_rst by setting Vprst high, Vbiasp sets the bias current of the pmos source follower MP8 which buffers node pd, and node int is reset by setting Vrst low.

In a first embodiment Vbiasp is kept constant so that the pmos source follower MP8 is biased with a small DC current (for example 2 nA or a few nA or a fraction of nA).

The time diagram of the control signals is illustrated in FIG. 18A. In a first phase, Vprst is set low. As an nmos transistor MN12 is used, the charge injection when Vprst is set low causes a voltage drop of node pd. As a pmos source follower MP8 is used, the source follower output follows quickly the voltage drop caused by charge injection, even though that there is only a very small current flowing in the source follower MP8. Then, node Vrst is set high, storing the KTC noise of pd node on capacitor Ccds. During the exposure phase, as the photocurrent makes the voltage on node pd decrease, the pmos source follower can buffer this voltage even though that it has a very small bias current.

If an nmos source follower (not illustrated) were used, the maximum slew rate at the source follower output would be set by the source follower bias current.

With the time diagram illustrated in FIG. 18B, the photodiode is reset at voltage vdd_rst by setting Vprst high, Vbiasp sets the bias current of the pmos source follower MP8 which buffers node pd, and node int is reset by setting Vrst low. Before setting Vprst low, in a first phase voltage Vbiasp is set to VDDA to completely turn off the bias current of the pmos source follower MP8. As it is a pmos source follower, its output will follow a decreasing voltage applied on the gate of the source follower, therefore following the voltage drop caused by the charge injection when turning off the transistor resetting the photodiode, and following the decreasing voltage caused by the photocurrent being integrated on the gate of the source follower.

It must be noted that in the pixel circuit of FIG. 17, advantageously the capacitor Ccds is reset to a local potential generated when MP1 is mounted in diode (while MP2 is conductive), and that Ccds is connected to a comparator (MP1-MN4-MN3). During the exposure phase, node int capacitively coupled to node fol follows node fol.

In another embodiment of FIG. 17 not illustrated, the photodiode 1 is connected to a first terminal of a cascode transistor and a second terminal of the cascode transistor is connected to the gate of the source follower MP8 and the source of the reset transistor MN12. During the exposure phase, an adequate voltage is applied on the gate of MN12 to use MN12 as a clamp transistor.

Figure 19:
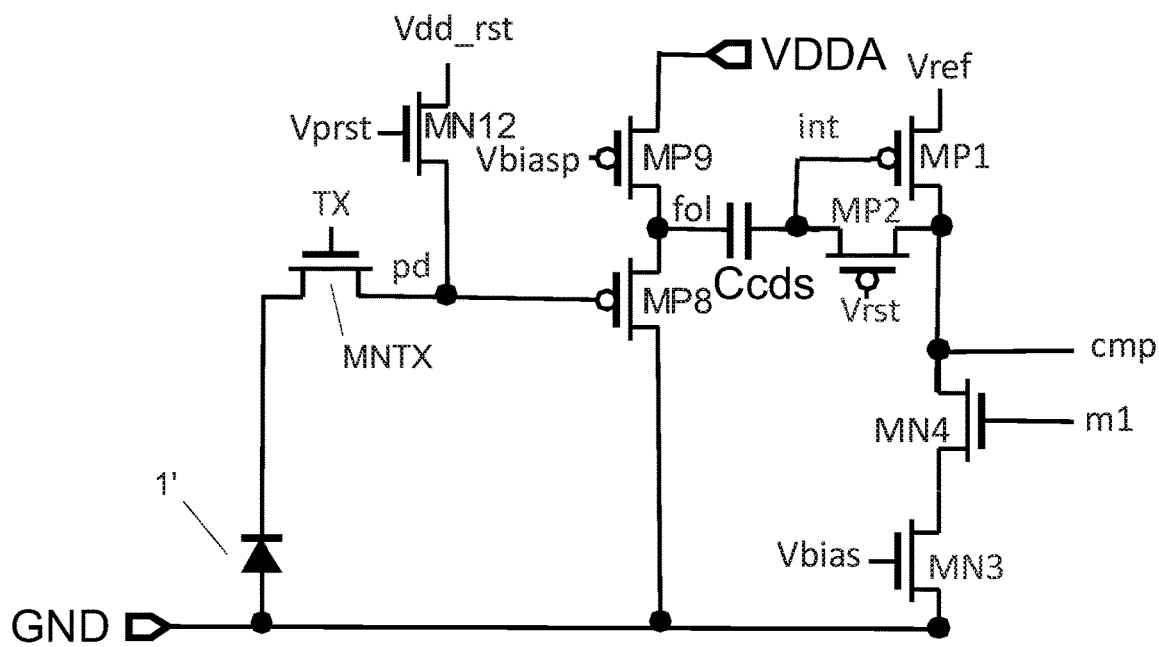
FIG. 19 shows an embodiment of a pixel circuit front-end.

FIG. 19 shows another embodiment of the invention. Here a transfer gate MNTX and a pinned photodiode 1' is used in conjunction with in-pixel analog CDS.

Figure 20A:
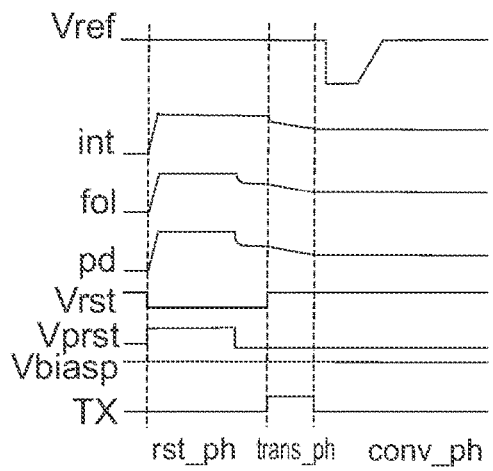
FIGS. 20A and 20B show two time diagrams for an acquisition of an image by the pixel circuit of FIG. 19.
Figure 20B:
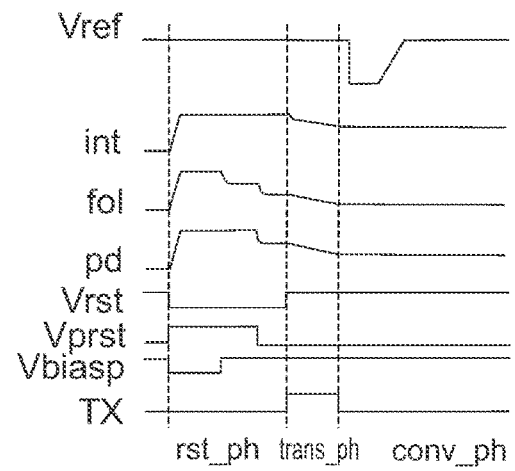

The corresponding time diagram is illustrated in FIGS. 20A and 20B.

Figure 21:
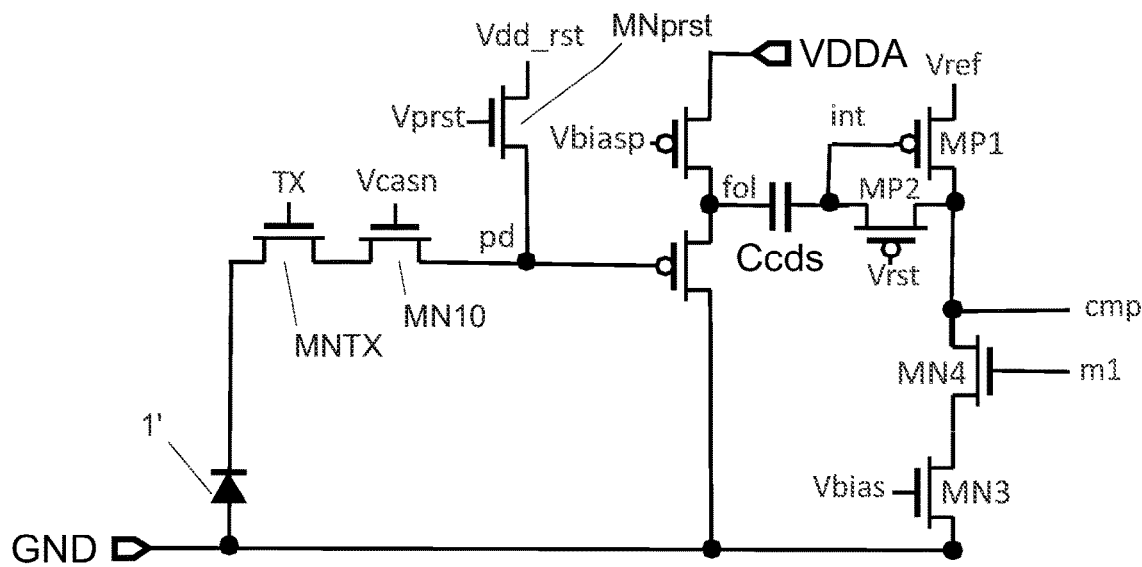
FIG. 21 shows another embodiment of a pixel circuit front-end.

In a further embodiment illustrated in FIG. 21, a cascode transistor MN10 is inserted between the transfer gate MNTX and node pd, and an adequate voltage is set on Vprst during the exposure phase so that the reset transistor acts as a clamp when the pinned photodiode is operated as a standard photodiode by keeping TX high all the time.

What is claimed is:

1. A pixel circuit for a ultra-low power image sensor, comprising:
   a photodiode for receiving a light beam representing a visual scene and for generating a photodiode current,
   an integration node, on which said photodiode current is integrated during an integration phase,
   a comparator arranged to compare a voltage at said integration node with a reference voltage, and to generate a comparator output voltage, said comparator comprising a current source arranged for generating a current,
   a memory element comprising a memory node,
   a writing pulse signal generator arranged to generate a writing pulse signal, on the basis of said comparator output voltage and on a voltage at said memory node, said writing pulse signal comprising a pulse having a start and an end,
   characterised in that
   said comparator further comprises a switch in series with said current source,
   said switch being arranged to be commanded by the voltage at said memory node so that said switch is open at the end of said pulse, so as to limit consumption of static power of the pixel circuit during said integration phase.

2. The pixel circuit of claim 1, wherein the memory element is a one-bit digital memory element, the pixel circuit further comprising a n-bits digital memory element for storing a digital word representative of a time elapsed since a beginning of the integration phase, where the writing pulse generator triggers a writing of said digital word in said n-bits digital memory element.

3. The pixel circuit of claim 1, said comparator being arranged so that the current in said comparator is null at a beginning of said integration phase and reaches the value of said current at an instant in which the voltage at said integration node reaches the reference voltage, corresponding to a time of generation of the writing pulse signal.

4. The pixel circuit of claim 1, said current source comprising a first transistor of a first type, said comparator comprising also a second transistor of a second type different from the first type, and comprising a first terminal connected to said reference voltage, a second terminal connected to said integration node, said second transistor being in series with the first transistor, said switch being placed between the first transistor and the second transistor.

5. The pixel circuit of claim 1, comprising a cascode transistor between the photodiode and the integration node, so as to raise sensibility of the pixel circuit.

6. The pixel circuit of claim 5, comprising a clamp transistor connected between the integration node and a supply voltage, so as to prevent a desaturation of the cascode transistor.

7. The pixel circuit of claim 1, comprising a transfer gate and wherein the photodiode is connected to the integration node through said transfer gate.

8. The pixel circuit of claim 1, comprising a reset switch allowing to reset the voltage at the integration node to a local black level voltage during a reset phase preceding said integration phase.

9. The pixel circuit of claim 8, wherein a fourth terminal of the second transistor and a fourth terminal of a transistor of the reset switch are shared so as to raise a voltage range during the integration phase.

10. The pixel circuit of claim 1, comprising an inverter at the output of the comparator, said inverter being arranged so that when the comparator output voltage is in a first state or in a second state, there is no static current consumption in the inverter.

11. The pixel circuit of claim 10, said inverter comprising a current source limiting the power consumption of the inverter during the transition from a first state to a second state of the comparator output voltage.

12. The pixel circuit of claim 4, wherein the photodiode is a pinned photodiode, the pixel circuit comprising also a transfer gate between the pinned photodiode and a gate of said second transistor.

13. The pixel circuit of claim 12, wherein the pixel circuit is operated with a voltage at the transfer gate kept high all the time.

14. The pixel circuit of claim 13, comprising a cascode transistor between the transfer gate and the integration node, to shield the integration node from a parasitic capacitance of the pinned photodiode, and a clamp transistor connected between the integration node and a supply voltage for preventing the integration node to drop below a saturation voltage of the cascode transistor.

15. The pixel circuit of claim 12, the transfer gate being a first transfer gate, the pixel circuit comprising a second transfer gate connected between the photodiode and a high voltage node, to enable to reset the photodiode independently of a time when charges are transferred to the integration node.

16. The pixel circuit of claim 1, comprising a source follower and a capacitor comprising a first terminal and a second terminal, wherein the first terminal is connected to a gate of a second transistor, wherein the second terminal is connected to an output of the source follower, wherein the photodiode is connected to a gate of the source follower as well as to a source of an nmos or a pmos reset transistor used to reset the photodiode at a defined voltage, and wherein the capacitance of the capacitor is chosen to be much larger than the capacitance of a sense node, so as to store the KTC noise of the sense node.

17. The pixel circuit of claim 16, where the photodiode is connected to a first terminal of a cascode transistor and a second terminal of the cascode transistor is connected to the gate of the source follower and the source of the reset transistor.

18. The pixel circuit of claim 16, wherein the source follower is a pmos source follower.

19. The pixel circuit of claim 16, wherein the photodiode is a pinned photodiode, the pixel circuit comprising also a transfer gate between the pinned photodiode and the gate of said second transistor, wherein the gate of the source follower is connected to a first terminal of the transfer gate, a second terminal of the transfer gate being connected to the pinned photodiode.

20. The pixel circuit of claim 19, wherein a cascode transistor is inserted between the transfer gate and the gate of the source follower.

21. A ultra-low power image sensor, comprising:
an array of pixels, each pixel being one pixel according to claim 1,
an oscillator generating a clock,
a counter module for counting the number of periods of the clock having elapsed since a beginning of the integration phase, and for delivering said number as a binary code to a n+1 bits digital memory.

22. The ultra-low power image sensor according to claim 21, wherein said counter module comprises a first counter, the image sensor comprising a second counter, said first counter being clocked by a clock generator so as to generate pulses at exponentially increasing intervals to clock the second counter, the output of the second counter being proportional to a logarithm of the time of the integration phase.

23. A camera device comprising:
a optic module,
the image sensor according to claim 21, for acquiring an image from the optic module,
a memory,
a microcontroller.

24. The camera device of claim 23, wherein said microcontroller is configured for
computing the difference between an acquired sub-sampled image and a reference sub-sampled image, and if this difference is larger than a given threshold value for any pixel of the sub-sampled image,
the microcontroller is configured for performing at least one of the following steps:
acquiring a full resolution image,
compressing those part of the image where said difference is higher than said threshold,
storing the result in said memory of the camera device,
updating pixels of said reference frame with a value of corresponding pixels in said part of the image which were compressed and stored.

* * * * *